US006822758B1

(12) United States Patent
Morino

(10) Patent No.: US 6,822,758 B1
(45) Date of Patent: Nov. 23, 2004

(54) IMAGE PROCESSING METHOD, SYSTEM AND COMPUTER PROGRAM TO IMPROVE AN IMAGE SENSED BY AN IMAGE SENSING APPARATUS AND PROCESSED ACCORDING TO A CONVERSION PROCESS

(75) Inventor: Takashi Morino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/342,393

(22) Filed: Jun. 29, 1999

(30) Foreign Application Priority Data

Jul. 1, 1998 (JP) .......................................... 10-186584
Aug. 4, 1998 (JP) .......................................... 10-220806
Sep. 11, 1998 (JP) .......................................... 10-258180

(51) Int. Cl.$^7$ .......................... H04N 1/40; H04N 1/409; H04N 1/58; H04N 1/60; G06T 5/00
(52) U.S. Cl. ...................... 358/1.9; 358/3.26; 358/3.24; 358/519
(58) Field of Search ............................. 358/3.26, 3.01, 358/3.21, 3.23, 463, 519, 518, 3.24; 382/255, 275, 167

(56) References Cited

U.S. PATENT DOCUMENTS

| | | | |
|---|---|---|---|
| 4,970,584 A | * 11/1990 | Sato et al. | 358/518 |
| 6,271,891 B1 | * 8/2001 | Ogawa et al. | 358/519 |
| 2002/0181000 A1 | * 12/2002 | Fukasawa et al. | 358/1.9 |

FOREIGN PATENT DOCUMENTS

| JP | 7-121703 | 5/1995 | |
|---|---|---|---|
| JP | 2002344763 A | * 11/2002 | ............ H04N/1/60 |

* cited by examiner

*Primary Examiner*—Scott Rogers
(74) *Attorney, Agent, or Firm*—Morgan & Finnegan, LLP

(57) ABSTRACT

The present invention relates to an image processing method, apparatus and computer program for improving an image sensed by an image sensing apparatus and processed according to a first conversion process. The present invention involves determining whether or not the first conversion process includes a nonlinear conversion, processing the image according to a second conversion process inverse to the first conversion process if the first conversion process includes the nonlinear conversion, and processing the image processed according to the second conversion process, according to a function for improving the image.

21 Claims, 19 Drawing Sheets

IMAGE PROCESSING METHOD, SYSTEM AND COMPUTER PROGRAM TO IMPROVE AN IMAGE SENSED BY AN IMAGE SENSING APPARATUS AND PROCESSED ACCORDING TO A CONVERSION PROCESS

BACKGROUND OF THE INVENTION

The present invention relates to an image processing apparatus, image processing method, image sensing apparatus, control method for the image sensing apparatus, and a memory and, more particularly, to an image processing apparatus and method which improve a defective image (degraded image), image sensing apparatus suitably combined with the image processing apparatus, control method for the image sensing apparatus, and memory for controlling the execution of the methods. In this specification, an image called a degraded image indicates a poor-quality image that is out of focus or blurred due to inappropriate movement of a camera or inappropriate image sensing conditions such as an exposure instead of indicating an image having undergone a change from a good image to a degraded image due to a change in quality over time or the like.

As methods of improving a degraded image, e.g., an out-of-focus image or blurred image, into an image with little degradation (ideal image), methods using a Wiener filter, general inverted filter, projection filter, and the like are available. To use these methods, a degradation function must be determined first. An ideal method of determining such a degradation function is a method of analytically obtaining a degradation function from physical factors such as image sensing conditions or estimating a degradation function on the basis of an output from a measuring device (e.g., an acceleration sensor) mounted in an image sensing apparatus.

A degradation function will be described below. The relationship between an ideal image f(x, y), a degraded image g(x, y), a degradation function h(x, y, x', y'), and random noise on output image v(x, y) is expressed as $$\iint h(x,y,x',y')f(x',y')dx'dy' + v(x,y) \quad (1)$$

If an image having a degraded point is not located at the point, except for translation, a point spread function (PSF) is expressed by h(x−x', y−y'), and mathematical expression (1) is rewritten into $$\iint h(x-x',y-y')f(x',y')dx'dy' + v(x,y) \quad (2)$$

If there is no noise, a Fourier transform of the two sides of mathematical expression (2) is performed, and a convolution theorem is applied to the resultant expression, equation (3) is obtained:

$$G(u,v) = H(u,v)F(u,v) \quad (3)$$

where G(u, V) H(u, v), and F(u, V) are the Fourier transforms of g(x, y), f(x, y), and h(x, y).

H(u, v) is the transfer function of a system for transforming the ideal image f(x, y) into the degraded image g(x, y).

A degradation model in degradation (blur) due to a relative movement between a camera and a scene (object) will be described below as an example. Assume that an image on the image sensing element of the camera remains unchanged over time except this relative movement. If the relative movement is approximately equal to the movement of the image sensing element in the same plane, the total exposure light amount at one point on the image sensing element can be obtained by integrating an instantaneous exposure light amount with respect to an exposure time. Assume that the time required to open/close the shutter can be neglected. Letting α(t) and β(t) be the x and y components of the displacement, equation (4) can be established:

$$g(x,y) = \int_{-T/2}^{T/2} f(x-\alpha(t), y-\beta(t))dt \quad (4)$$

where T is the exposure time, and the integration range is set from t=−T/2 to t=T/2 for the sake of convenience.

A Fourier transform of the two sides of equation (4) yields equation (5):

$$G(u,v) = \int dx \int dy \exp[-j2\pi(ux-vy)] \int_{-T/2}^{T/2} dt f(x-\alpha(t), y-\beta(t)) \quad (5)$$

$$= \int_{-T/2}^{T/2} dt \int dx \int dy f(x-\alpha(t), y-\beta(t)) \exp[-j2\pi(ux-vy)]$$

If x−α(t)=ξ and y−β(t)=η, equation (5) is rewritten into equation (6):

$$G(u,v) = \int dx \iint d\xi d\eta f(\xi, \eta) \times \quad (6)$$

$$\exp[-j2\pi(u\xi - v\eta)] \exp[-j2\pi(\alpha(t)u + \beta(t)v)]$$

$$= F(u,v) \int_{-T/2}^{T/2} \exp[-j2\pi(u\alpha(t) + v\beta(t))]dt = F(u,v)H(u,v)$$

According to equation (6), the degradation is modeled by equation (3) or mathematical expression (2) which is equivalent to equation (3). The transfer function H(u, v) for this degradation is given by $$H(u,v) = \int_{-T/2}^{T/2} \exp[-j2\pi(u\alpha(t)+v\beta(t))]dt \quad (7)$$

In this case, if camera shake occurs in a direction at an angle θ with respect to the x-axis at a predetermined speed V for a time T, a point response function is given as $$H(u,v) = \frac{\sin \pi \omega T}{\pi \omega} \quad (8)$$

where ω is given by equation (9)

$$\omega = (u-u_o)V \cos \theta + (v-v_o)V \sin \theta \quad (9)$$

where $u_o$ and $v_o$ are the center coordinates of the image. When ω is minimum, H(u, v)=T is approximately established.

Likewise, a degradation model of degradation due to a blur can be expressed by a function. Assume that a phenomenon of blurring is based on a normal (Guassian) distribution rule. In this case, letting r be the distance from a central pixel and $\sigma^2$ is an arbitrary parameter in the normal distribution rule, a degradation function h(r) is given by $$h(r) = \frac{1}{\sigma\sqrt{2\pi}} \exp\left(-\frac{r^2}{\sigma^2}\right) \quad (10)$$

Processing for improving a degraded image using an inverted filter will be described next. Assume that the degraded image g(x, y) and the ideal image f(x, y) are based on the model expressed by mathematical expression (2). If there is no noise, the Fourier transforms of g(x, y), f(x, y), PSF, and h(x, y) satisfy equation (3). In this case, equation (3) is modified into $$F(u,v) = G(u,v)/H(u,v) \quad (11)$$

According to equation (11), if H(u, v) is known, the ideal image f (x, y) can be improved by multiplying the Fourier transform G(u, v) of the degraded image by 1/H(u, v) and performing an inverse Fourier transform of the product. In other words, the transfer function of the filter is 1/H(u, v).

In practice, the application of equation (3) poses various problems. For example, in consideration of noise, mathematical expression (2) can be written into $$G(u,v)=H(u,v)F(u,v)+N(u,v) \quad (12)$$

where N(u, v) is the Fourier transform of v(x, y).

According to equation (12), when the filter (1/H) (u, v)) is applied to the Fourier transform of the degraded image, equation (13) is established:

$$\frac{G(u, v)}{H(u, v)} = F(u, v) + \frac{N(u, v)}{H(u, v)} \quad (13)$$

Consider a system in which the degraded image recorded by the digital camera is loaded into an information processing apparatus by an image receiving unit controlled by a TWAIN driver or the like, and the degraded image is improved to generate an ideal image. In this case, a technique of determining a degradation function obtained by modeling the process of generating a degraded image, and improving the degraded image by using an image improving algorithm generally called deconvolution using a Wiener filter or the like is considered as the most effective improving technique.

In such a conventional technique, however, since no consideration is given to degradation parameters (e.g., a shake direction, shake speed, and the like if degradation is caused by camera shake) required to determine a degradation function and image sensing conditions (an exposure time, exposure light amount, and the like), a sufficient improving effect for a degraded image cannot be obtained.

Many studies have been made on techniques of obtaining a degradation parameter by estimating a degradation state from the image feature amount (e.g., an auto-correlation function) of a degraded image. A method of estimating a line spread function, edge spread function, or the like instead of the above point spread function is also available. For example, the following method of determining a degradation function is known. In this method, if an acute edge portion is present in an original image, the edge portion is differentiated to obtain a line spread function, and a degradation function is determined by using an image reconstruction method.

If, however, an image is to be improved by using an image improving algorithm using a Wiener filter or the like, only several percent of an error included in a parameter will cause large noise to be superimposed on an improved image. For example, in the technique of obtaining a degradation parameter by estimating a degradation state from the image feature amount (e.g., an auto-correction function) of a degraded image, since the parameter often includes a large error, the improving effect is low. Even if a measuring device (acceleration sensor or the like) mounted in an image sensing apparatus such as a camera is to be used, since it is technically very difficult to suppress an error within several percent, the problem of a parameter error cannot be neglected.

As described above, in the prior art, no consideration is given to degradation parameters, image sensing conditions, and the like which are required to determine a degradation function, and a degradation parameter cannot be accurately estimated. For this reason, even if a degraded image is improved, the improving effect is not sufficient.

In the technique of using an edge spread function to estimate a degradation parameter, it is difficult to extract an edge portion, because the original image is degraded. The present applicant has proposed a technique (Japanese Patent Laid-Open No. 7-121703) of designating a small area, of a degraded image, which includes an edge portion, improving the image within the small area while changing a parameter of a degradation function, obtaining the degree of image improvement corresponding to the parameter, and improving the entire image by using a parameter with which the degree of image improvement becomes the highest. This proposal, however, can be applied to only estimation of an edge spread function but cannot be applied to estimation of a point spread function.

An edge portion of an original image corresponds to a high-frequency component in terms of frequency. When the image is to be improved by using various filters, the edge portion is an area on which the largest noise is superimposed. Even if, therefore, a parameter with which the degree of image improvement becomes the highest is obtained, the possibility of a low precision due to noise is high. In addition, it is cumbersome to designate a small area, of an original image, which includes an edge portion every time improving operation is performed.

In general, in a system including a digital camera, an image is loaded into an information processing apparatus by an image receiving unit controlled by a TWAIN driver or the like, and the resultant image is output to an image output apparatus (e.g., a printer or display). In this case, the image processing controlled by the TWAIN driver or the like generally includes gamma correction, color conversion, and the like. However, gamma correction, color conversion, and the like belong to a nonlinear system and contradict an LTI (Linear Time-Invariant) system serving as a precondition for the above image improving algorithm. That is, when a degraded image having undergone gamma correction or color conversion is improved, very large noise is superimposed on the improved image.

Consider a system for converting a degraded image recorded on a silver halide film into an electronic image by using an image input device such as a film scanner, and improving the degraded image by arithmetic operation. In general, such a system also uses a technique of forming a degradation function by modeling the process of generating a degraded image and improving the image by using an image improving algorithm generally called deconvolution using a Wiener filter or the like. This technique is regarded as the most effective improving technique.

In practice, however, the electronic image information has been affected by the aberrations of the lenses of the image sensing apparatus, and the luminance value has been converted by the characteristics (ISO, film γ, and the like) of the film itself, the gamma characteristics of the photoelectric conversion system of the image input device such as a film scanner, and the like.

The above lens aberrations, film characteristics, and scanner characteristics (so-called scanner γ and the like) also generally belong to a nonlinear system and contradict an LTI (Linear Time-Invariant) system as a precondition for the image improving algorithm described above. That is, when the degraded image obtained in the above manner is improved by deconvolution, very large noise is superimposed on the improved image.

Even if an extremely ideal improved image is generated, noise superimposed on the improved image cannot be completely eliminated. In addition, since the improved image has no correlation with the color gradation and luminance distribution of the original image, the improved image cannot become an image that is worth looking at without any processing.

SUMMARY OF THE INVENTION

The present invention has been made in consideration of the prior art, and has as its object to provide an image processing method and apparatus for improving an image with a high precision while keeping the computation load low in improving an image using various degradation functions including degradation parameters even if no estimated value is available for each degradation parameter or an error is included in the degradation parameter obtained by analytical estimation or from an output from a measuring device mounted in the image sensing apparatus.

The present invention has been made in consideration of the above situation, and has as its object to obtain a high-quality improved image from a degraded image.

It is another object of the present invention to provide an image improving system and method which improve a degraded image by using degradation information required to increase the improving effect while suppressing noise to a minimum, and perform image processing for the image to finally obtain an image that is worth looking at.

It is still another object of the present invention to provide an image improving method and system for improving an image with a high precision while keeping the computation load low in improving an image using various degradation functions including degradation parameters even if no estimated value is available for each degradation parameter or an error is included in the degradation parameter obtained by analytical estimation or from an output from a measuring device mounted in the image sensing apparatus.

In one aspect, the present invention relates to an image processing method, apparatus and computer program for improving an image sensed by an image sensing apparatus and processed according to a first conversion process. The method, apparatus and computer program involve determining whether or not the first conversion process includes a nonlinear conversion, processing the image according to a second conversion process inverse to the first conversion process if the first conversion process includes the nonlinear conversion, and processing the image processed according to the second conversion process, according to a function for improving the image.

According to an aspect of the present invention, there is provided an image processing method of improving an image sensed by an image sensing apparatus, comprising:

the input step of inputting image data representing the image through input means;

the inversion step of performing, for the image, processing inverse to conversion processing performed for the input image data; and the improving step of performing improving processing for the image having undergone the inversion processing on the basis of a degradation function in image sensing operation.

Preferably, the inversion step further comprises the acquisition step of acquiring information on the conversion processing performed for the input image data.

The acquisition step preferably comprises looking up a table in which a type of the input means is made to correspond to a conversion processing method used by the input means, and acquiring information on the conversion processing performed for the image data on the basis of the type of the input means.

The improving step preferably comprises obtaining a degradation function on the basis of characteristic information on the image sensing apparatus, and performing improving processing for the image data on the basis of the degradation function.

The improving step preferably comprises looking up a table in which a type of an image sensing apparatus for sensing an image is made to correspond to characteristics of the apparatus, and acquiring the characteristic information on the basis of the type of image sensing apparatus.

The conversion processing is preferably nonlinear conversion processing.

The nonlinear conversion processing preferably includes gray scale conversion.

Preferably, the image data has undergone one of conversion processing including a nonlinear conversion and conversion processing including no nonlinear conversion in accordance with a conversion mode, the input step comprises inputting the conversion mode together with image data, and the inversion step comprises referring to information of the conversion mode and performing inversion processing for the image data if the image data has undergone a conversion including a nonlinear conversion.

Preferably, the input step comprises inputting, together with image data, a degradation parameter which is recorded by the image sensing means together with an image and indicates a physical quantity of an event as a cause of degradation, and the improving step comprises specifying a degradation function on the basis of the degradation parameter, and performing improving processing for the image in accordance with the degradation function.

Preferably, the input step comprises inputting, together with image data, an image sensing condition, which is recorded by the image sensing means together with an image, and the improving step comprises specifying a degradation function on the basis of the image sensing condition and performing improving processing for the image data in accordance with the degradation function.

Preferably, the method further comprises the post-processing step of performing, for the image data improved in the improving step, inversion processing to the inversion processing performed for the image data in the inversion step.

Preferably, the post-processing step further comprises determining a degree of degradation on the basis of the degradation parameter, and performing noise removal processing for the image data if it is determined that the degree of degradation is high.

Preferably, the image sensing apparatus electronically records light from an object to be image-sensed as image data by photoelectric conversion, and the input step comprises inputting the electronically recorded image data.

Preferably, the image sensing apparatus optically records an image on a silver halide film, and the input step comprises inputting the image data by using input means for photo-electrically converting the image on the silver halide film.

Preferably, the image sensing apparatus records characteristic information of the image sensing apparatus and/or an image sensing condition and/or a degradation parameter on a magnetic medium corresponding to a silver halide film, and the input step comprises inputting the pieces of information together with image data.

According to the second aspect of the present invention, there is provided an image processing method of improving an image having suffered degradation in image sensing operation by using a degradation function for quantifying the degradation, comprising:

the first improving step of improving the image by using the degradation function while changing a degradation parameter included in the degradation function;

the improvement degree calculation step of obtaining a degree of image improvement of the improved image; and the second improving step of selecting a degradation parameter with which the degree of image improvement becomes highest, and generating an improved image by a degradation function to which the parameter is applied.

The improving step preferably comprises improving the image while changing a value of one parameter at a time, and repeatedly improving the image while changing a value of a next parameter after a value of one parameter with which the degree of image improvement become highest is determined.

Preferably, the method further comprises the segmentation step of segmenting the image, the first improving step comprises improving the image with respect to an image area selected from segmentated areas, and the second improving step comprises performing improving processing for the entire image.

Preferably, the method further comprises the selection step of selecting an area, of the areas segmented in the segmentation step, in which a center of gravity of a frequency distribution corresponds to a highest frequency, and the first improving step comprises improving the area selected in the selection step.

Preferably, the method further comprises the input step of inputting a value of a degradation parameter, and the first improving step comprises improving the image by using the degradation function while changing a value of a degradation parameter included in the degradation function within a predetermined range including a value input in the input step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

The preferred embodiments of the present invention will be described below.

[First Embodiment]

Figure 1:
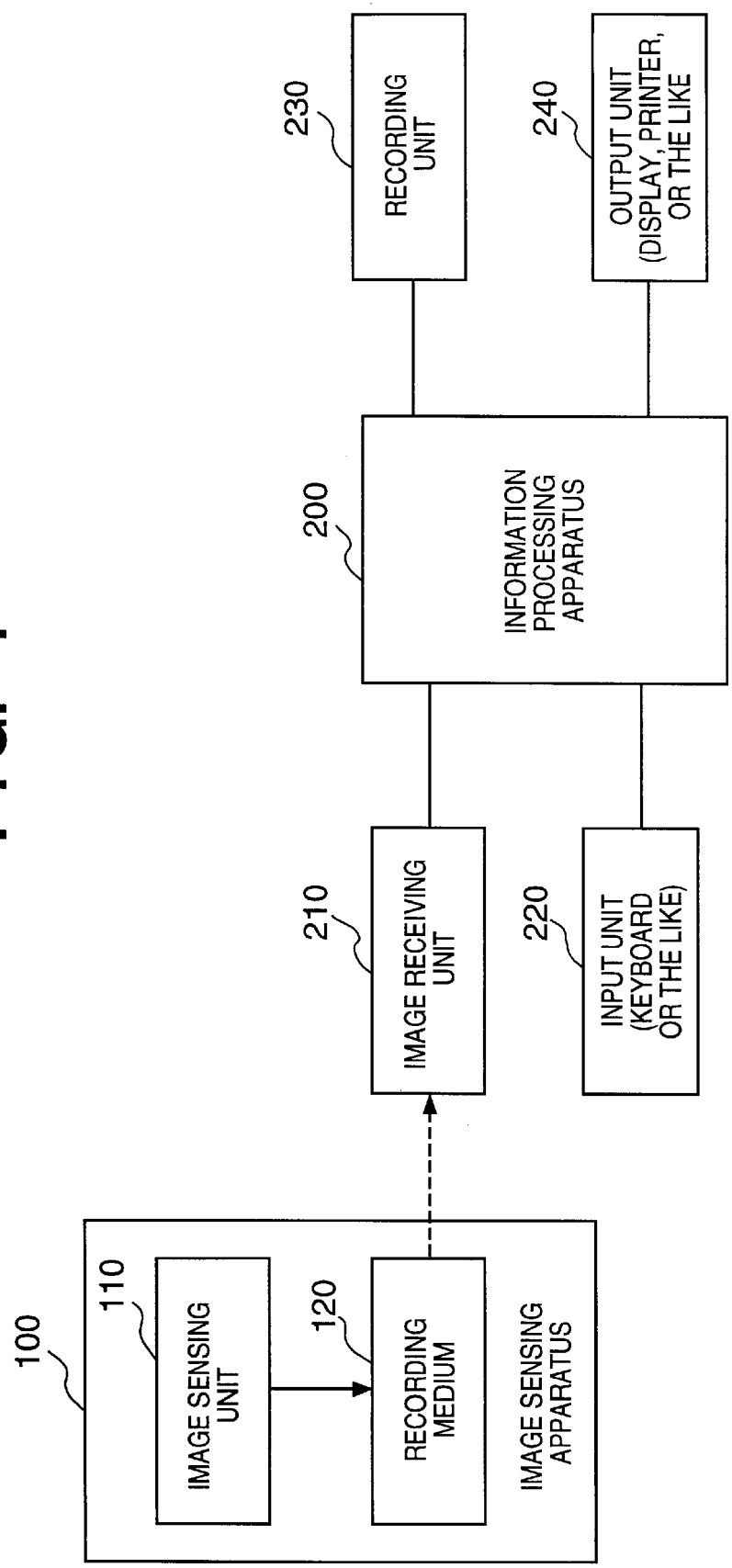
FIG. 1 is a block diagram showing the schematic arrangement of an image processing system according to the first embodiment of the present invention.

FIG. 1 shows the schematic arrangement of an image processing system according to the first embodiment of the present invention. For example, an image sensing apparatus 100 is a digital camera and includes an image sensing unit 110 and a recording medium 120.

For example, the image sensing unit 110 is comprised of an optical system such as lenses, an image sensing element such as a CCD sensor, and the like, and records image information related with a sensed image on the recording medium 120. For example, the recording medium 120 is a hard disk, flash memory, or the like.

For example, an image receiving unit 210 is controlled by a driver such as a TWAIN driver. The image receiving unit 210 reads out image information from the recording medium 120, performs predetermined image processing for an image related with the image information, and supplies the resultant information to an information processing apparatus 200.

In general, the image processing in the image receiving unit 210 includes color interpolation, optical correction, and the like, provided that the image sensing apparatus 100 is a single-plate digital camera. In this case, for the sake of simplicity, only gray scale conversion such as gamma correction and color conversion will be described as the image processing in the image receiving unit 210.

The information processing apparatus 200 improves an image (degraded image) related with the image information supplied from the image receiving unit 210 to generate an image with little degradation in accordance with an instruction given by a user through an input unit 220 constituted by a keyboard, mouse, and the like. For example, the improved image is stored in a recording unit 230 or output to an output unit 240. As the output unit 240, for example, a display or printer can be suitably used.

Figure 2:
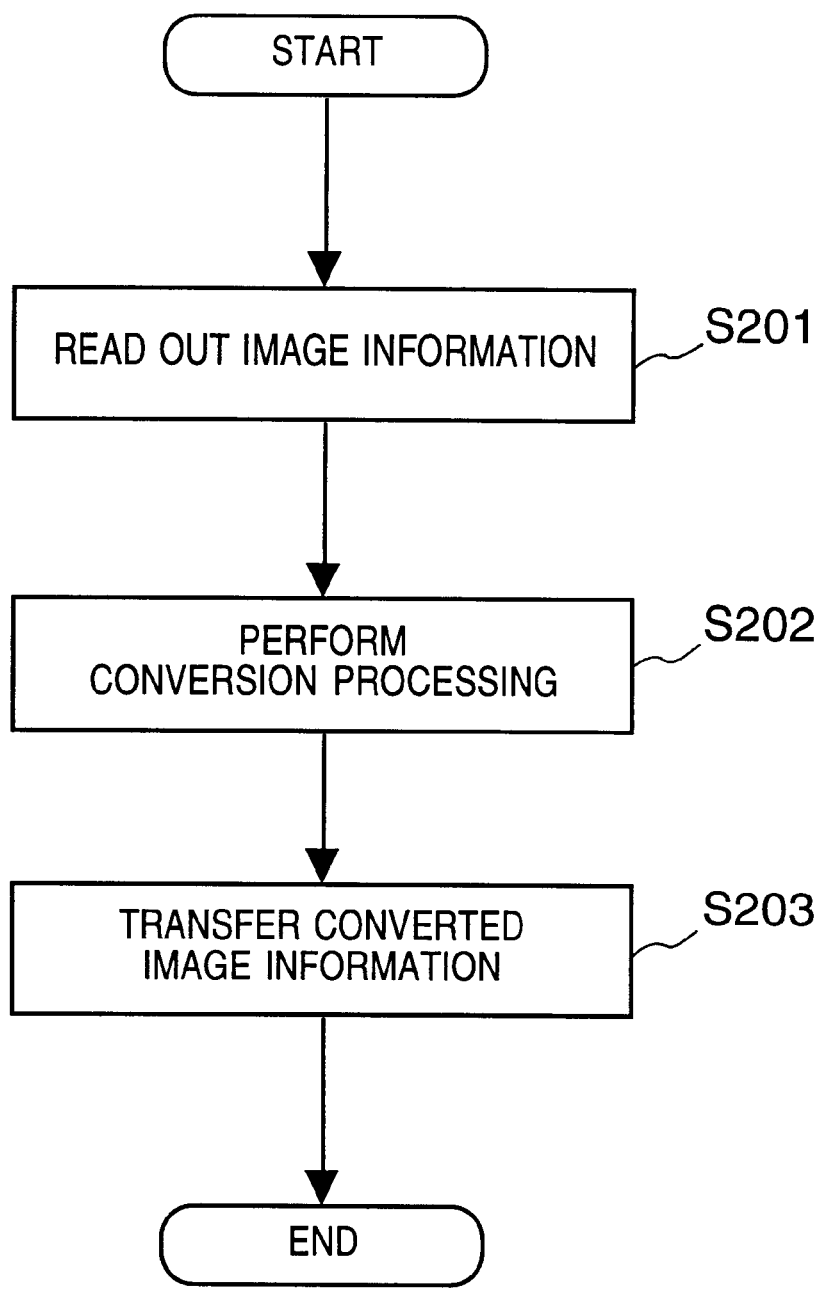
FIG. 2 is a flow chart showing the flow of operation of an image receiving unit in FIG. 1.

FIG. 2 is a flow chart showing the flow of operation of the image receiving unit 210. For example, the processing shown in this flow chart is executed by a CPU (not shown) on the basis of a program stored in a memory (not shown). First of all, in step S201, the image receiving unit 210 reads out image information from the recording medium 120. This image information is image information of an image that has been degraded in image sensing operation. In step S202, the image receiving unit 210 performs conversion processing for the image information. This conversion processing includes, for example, gamma correction and color conversion. In step S203, the image receiving unit 210 transfers the converted image information to the information processing apparatus 200.

Figure 3:
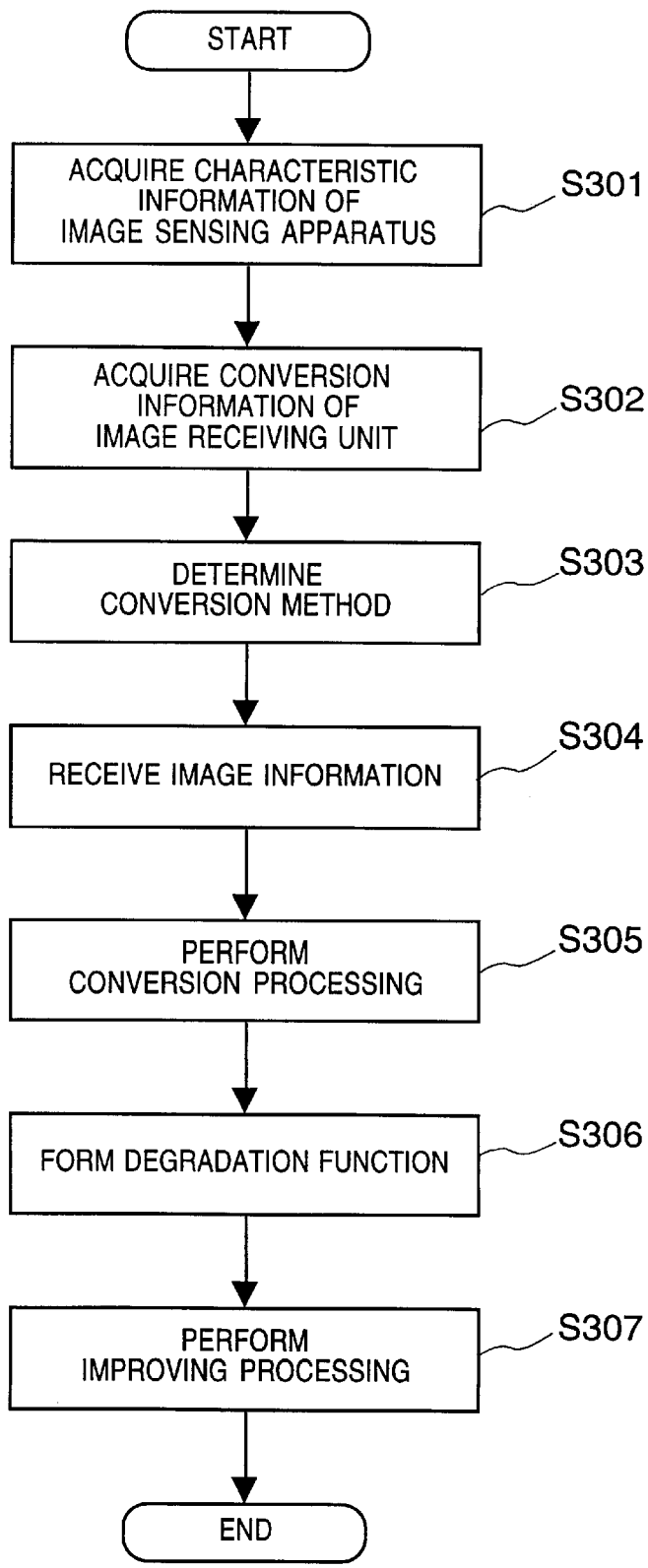
FIG. 3 is a flow chart showing the flow of operation of an information processing apparatus in FIG. 1.

FIG. 3 is a flow chart showing the flow of operation of the information processing apparatus 200. Note that the processing shown in this flow chart is executed by the CPU (not shown) on the basis of a program stored in the memory (not shown).

First of all, in step S301, the information processing apparatus 200 acquires characteristic information indicating the characteristics of the image sensing apparatus 100. For example, this characteristic information can be acquired by selecting the characteristic information of the corresponding image sensing apparatus from the characteristic information of a plurality of types of image sensing apparatuses which are stored in the memory in the information processing apparatus 200 in advance on the basis of, for example, the apparatus type information supplied through the input unit 220.

In step S302, the information processing apparatus 200 acquires conversion information indicating the contents of conversion processing in the image receiving unit 210. For example, this conversion information is stored in the memory in the information processing apparatus 200 when a driver for connecting the image receiving unit 210 and the information processing apparatus 200 is installed in the information processing apparatus 200.

In step S303, the information processing apparatus 200 determines a conversion method of converting the image information supplied from the image receiving unit 210. More specifically, the information processing apparatus 200 determines a conversion method on the basis of the conversion information acquired in step S302 (the characteristic information acquired in step S301 in addition to the conversion information, as needed). The conversion method determined in this case is a method of converting image information to set an exposure amount and pixel value in a proportional relationship so as to ensure linearity as a precondition for an algorithm for the above image improving processing.

A table in which the types of image sensing apparatuses, the types of image receiving units, and conversion methods are made to correspond to each other may be prepared in the information processing apparatus 200 to select an appropriate conversion method by specifying the types of image sensing apparatus and image receiving unit. Note that this conversion method may be determined on the basis of an instruction from the user.

The contents (conversion method) of conversion processing on the information processing apparatus 200 side in executing gamma correction on the image receiving unit 210 side will be described in detail below. Letting g(x, y) be the image (degraded image) output from the image sensing unit 110 of the image sensing apparatus 100, and gg(x, y) be the image obtained after gamma correction by the image receiving unit 210, the image gg(x, y) is expressed as:

$$gg(x, y) = g(x, y)^{1/\gamma} \quad (14)$$

That is, an image with linearity can be obtained by executing an inversion to the processing represented by equation (14). With this inversion, the image g(x, y) can be reconstructed from the image gg(x, y).

When color correction is to be executed by the image receiving unit 210, the information processing apparatus 200 can obtain an image with linearity by executing an inversion to the conversion by the color correction. Obviously, when the image receiving unit 210 is to execute both γ correction and color correction, the information processing apparatus 200 may execute an inversion to the conversion by the γ correction and an inversion to the conversion by the color correction. There is no need to consider processing other than gray scale conversions such as color interpolation.

In step S303, for example, a conversion method equivalent to an inversion to the conversion by the image receiving unit 210 is determined in the above manner.

In step S304, the information processing apparatus 200 receives image information from the image receiving unit 210. In step S305, the information processing apparatus 200 converts the received image information in accordance with the conversion method determined in step S303.

In step S306, a degradation function H(u, v) is formed on the basis of the characteristic information on the image sensing apparatus 100 which is acquired in step S301. Note that the degradation function is described in "BACKGROUND OF THE INVENTION" with reference to equations (7), (8), (10) and the like.

In step S307, an image f(x, y) with little degradation is reconstructed from the image information (image g(x, y)) converted in step S305 on the basis of the degradation function H(u, v) formed in step S306. More specifically, a Fourier transform G(u, v) of the image g(x, y) is multiplied by 1/H(u, v) to obtain a Fourier transform F(u, v) of the image f(x, y). An inverse Fourier transform of F(u, v) is then performed to improve the image f(x, y) with little degradation.

First of all, in the above manner, inversion to nonlinear conversion typified by gray scale conversion such as gamma correction and color conversion is performed to an input image that has undergone the nonlinear conversion. An inverse transform to the degradation function is performed for the inverted image information, thereby preventing large noise from being superimposed on the improved image.

[Second Embodiment]

Figure 4:
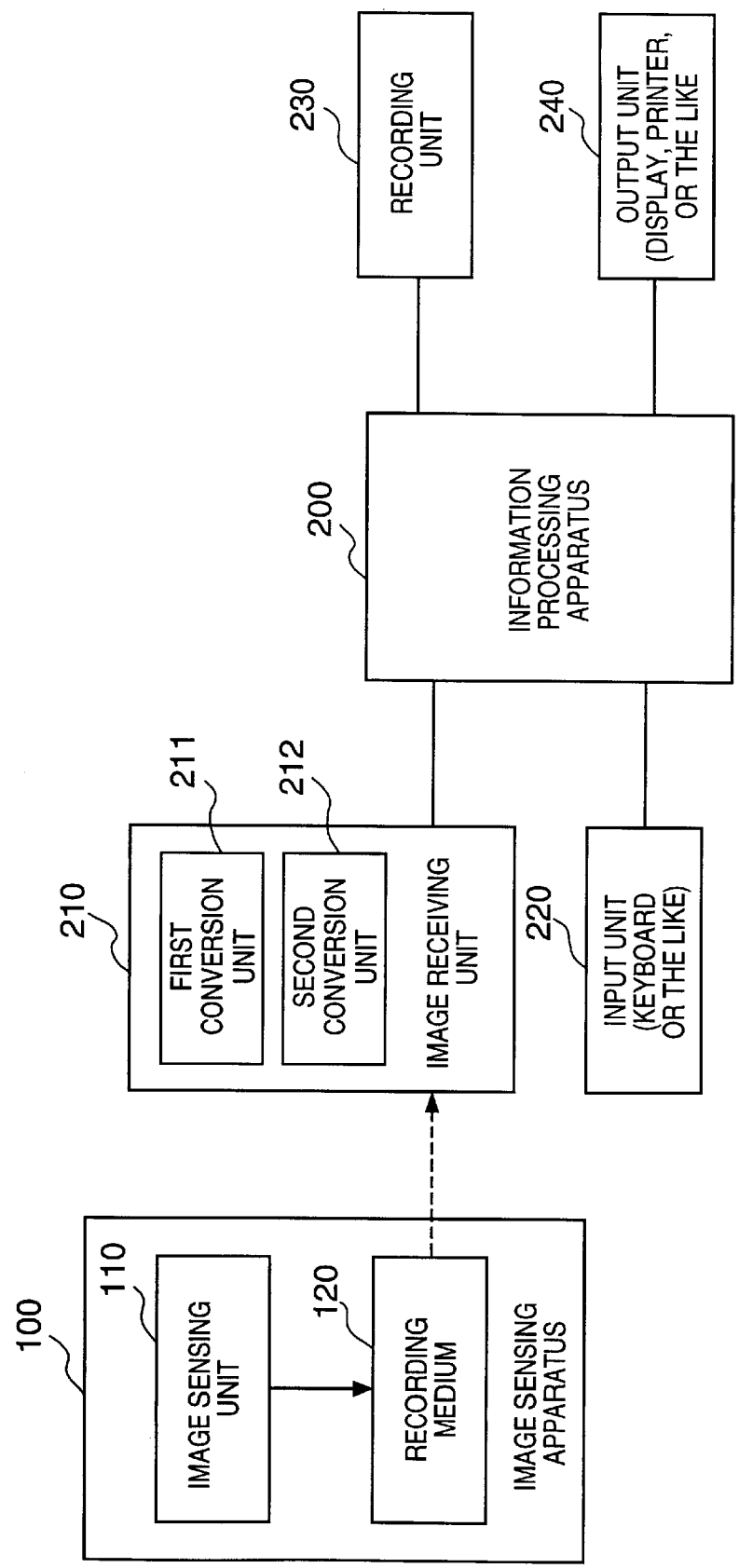
FIG. 4 is a block diagram showing the schematic arrangement of an image processing system according to the second embodiment of the present invention.

FIG. 4 shows the schematic arrangement of an image processing system according to the second embodiment of the present invention. Note that the same reference numerals in the second embodiment denote the same parts as those of the image processing apparatus according to the first embodiment, and a description thereof will be omitted.

An image receiving unit 210 according to this embodiment includes first and second conversion units 211 and 212 as a plurality of conversion units. These conversion units can be selectively used upon switching to convert the image information read out from a recording medium 120. This switching may be performed in accordance with an instruction given by a user through an operation unit mounted on the image receiving unit 210 or an instruction from an information processing apparatus 200.

Assume that the first conversion unit 211 performs conversion processing including nonlinear processing (e.g., γ correction and color correction), and the first conversion unit 211 performs conversion processing as linear processing.

Figure 5:
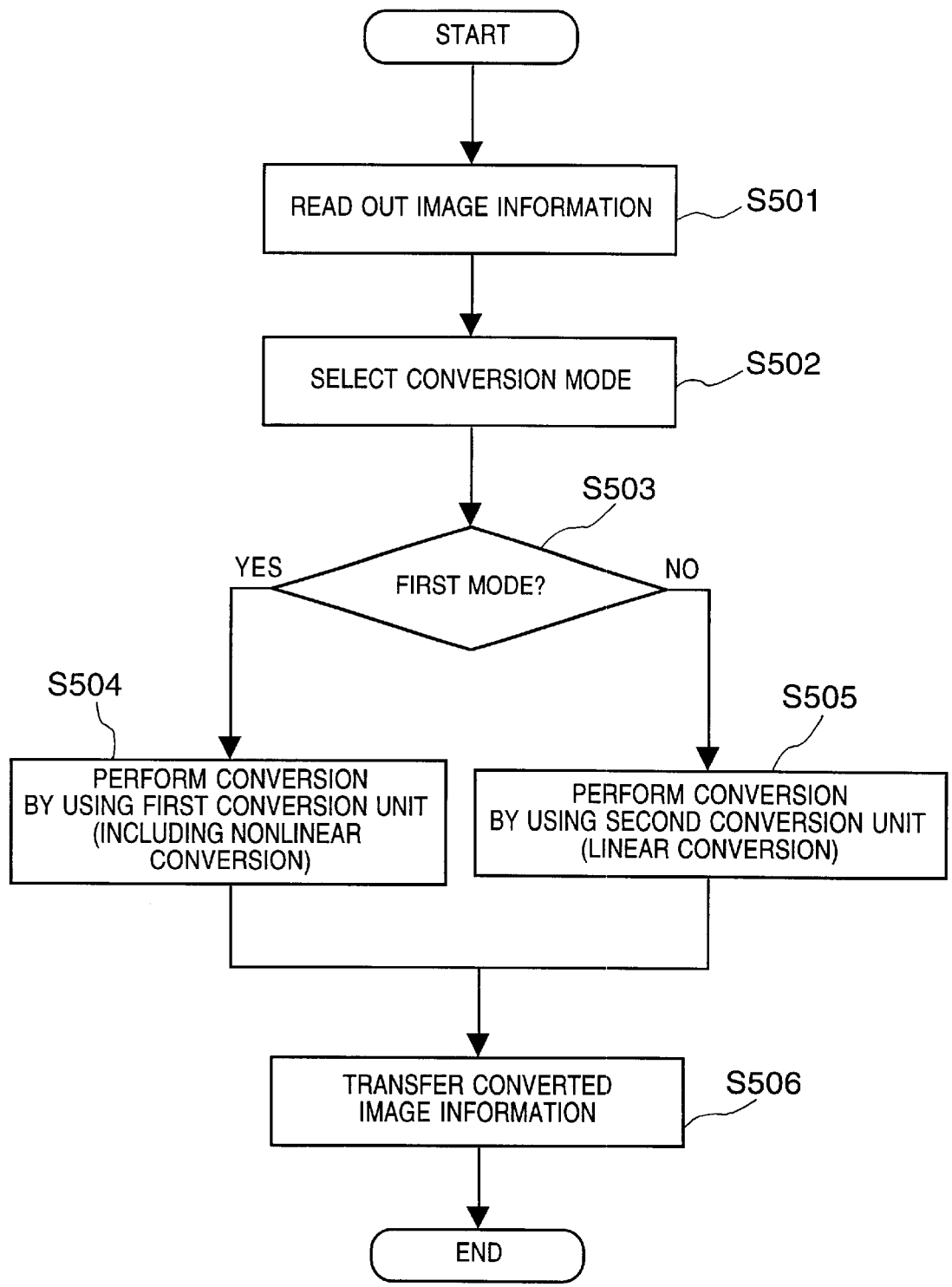
FIG. 5 is a flow chart showing the flow of operation of an image receiving unit in FIG. 4.

FIG. 5 is a flow chart showing the flow of operation of the image receiving unit 210 in FIG. 4. For example, the processing shown in this flow chart is executed by a CPU (not shown) on the basis of a program stored in a memory (not shown). First of all, in step S501, the image receiving unit 210 reads out image information from the recording medium 120.

In step S502, for example, the image receiving unit 210 selects a conversion mode on the basis of an instruction given by the user through the operation unit (not shown) mounted on this unit or an instruction from the information processing apparatus 200. In step S503, a branch is caused in accordance with the selected conversion mode. If the conversion mode is the first mode, the flow advances to step S504. If the conversion mode is the second mode, the flow advances to step S505.

In step S504, the first conversion unit 211 converts the image information read out from the recording medium 120. In step S505, the second conversion unit 212 converts the image information.

In step S506, the converted image information is transferred to the information processing apparatus 200.

Figure 6:
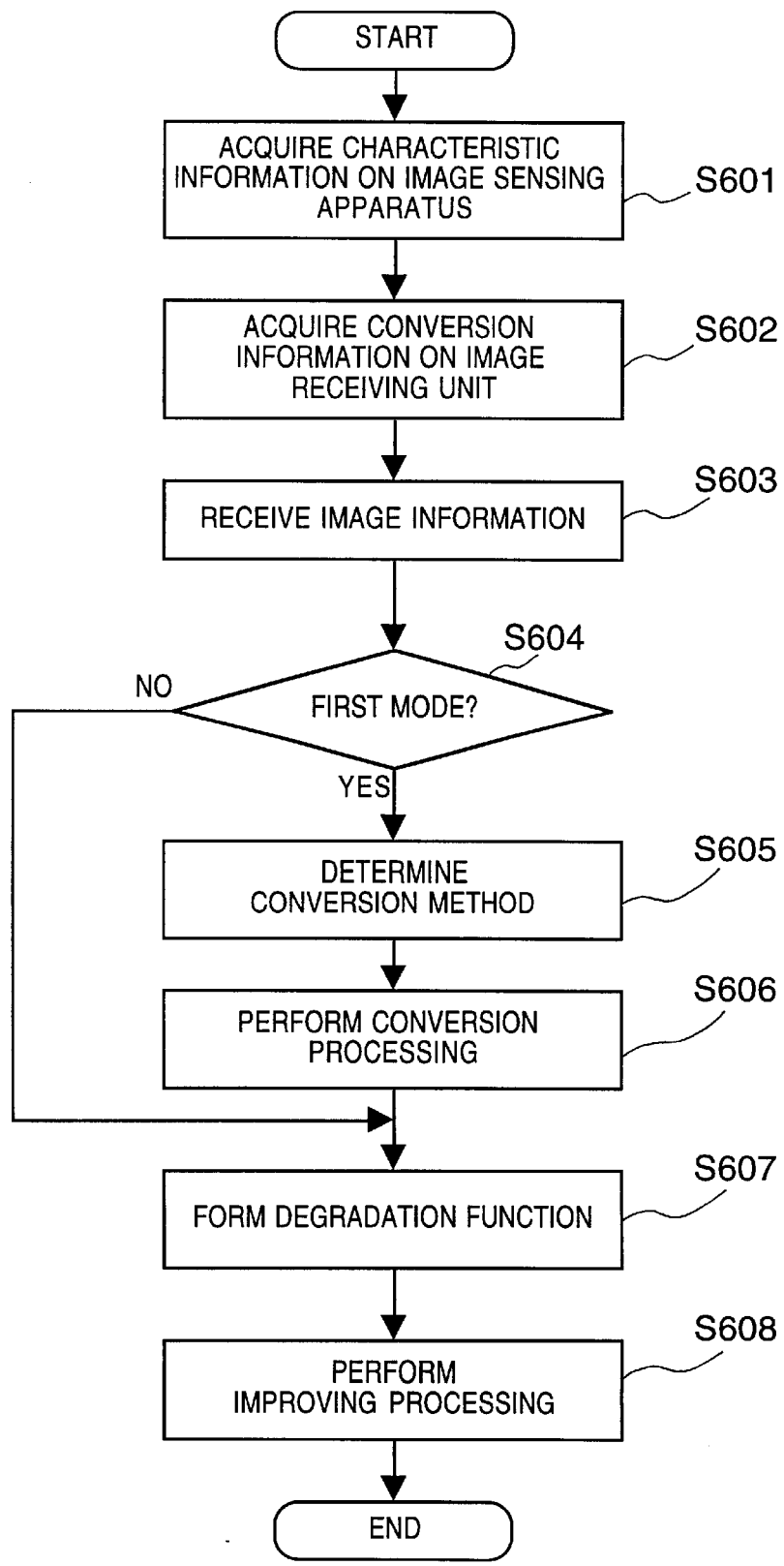
FIG. 6 is a flow chart showing the flow of operation of an information processing apparatus in FIG. 4.

FIG. 6 is a flow chart showing the flow of operation of the information processing apparatus 200 in FIG. 4. Note that the processing shown in this flow chart is executed by the CPU (not shown) on the basis of a program stored in the memory (not shown).

First of all, in step S601, the information processing apparatus 200 acquires characteristic information indicating the characteristics of the image sensing apparatus 100. For example, this characteristic information can be acquired by selecting the characteristic information on the corresponding image sensing apparatus from pieces of characteristic information on a plurality of types of image sensing apparatuses which are stored in the memory in the information processing apparatus 200 on the basis of apparatus type information supplied through the image receiving unit 210.

In step S602, the information processing apparatus 200 acquires conversion information indicating the contents of conversion processing (image processing) in the image receiving unit 210. For example, this conversion information is stored in the memory in the information processing apparatus 200 when a driver for connecting the image receiving unit 210 and the information processing apparatus 200 to each other is installed in the information processing apparatus 200.

In step S603, the information processing apparatus 200 receives image information from the image receiving unit 210.

In step S604, it is checked whether the conversion mode of conversion processing performed by the image receiving unit 210 is the first or second mode. If the first mode is determined, the flow advances to step S605. If the second mode is determined, the flow advances to step S607. When this conversion mode is to be determined on the image receiving side 210, information indicating a conversion mode and related with this determination is preferably acquired from the image receiving side 210. Note that this information may be obtained through the input unit 220.

In step S605, the information processing apparatus 200 determines a conversion method used to convert the image information supplied from the image receiving side 210. More specifically, the information processing apparatus 200 determines a conversion method on the basis of the conversion information acquired in step S602 (the characteristic information acquired in step S601, as needed, instead of the conversion information). The conversion method determined in this case is a method of converting image information to set an exposure amount and pixel value in a proportional relationship so as to ensure linearity as a precondition for an algorithm for the above image improving processing. More specifically, this method is the same as that used in the first embodiment.

In step S606, the received image information is converted in accordance with the conversion method determined in step S605.

In step S607, a degradation function H(u, v) is formed on the basis of the characteristic information of the image sensing apparatus 100 which is acquired in step S301. Note that the degradation function has been described in "BACKGROUND OF THE INVENTION".

In step S608, an image f(x, y) with little degradation is reconstructed from the image information (image g(x, y)) converted in step S606 if the conversion mode is the first mode, or from the image information (image g (x, y)) received in step S603 if the conversion mode is the second mode, on the basis of the degradation function H(u, v) formed in step S607. More specifically, this processing is the same as that in the first embodiment.

As described above, when the image receiving side 210 selects a conversion mode to convert image information and executes conversion processing (including nonlinear processing) in the first mode, the information processing apparatus 200 executes the same processing as that in the first embodiment. When the image receiving side 210 executes conversion processing (linear conversion processing) in the second mode, the information processing apparatus 200 regards the image information itself received from the image receiving side 210 as a target for improving processing.

With this processing, for only an input image having undergone nonlinear conversion typified by gray scale conversion such as gamma correction and color conversion, inversions to these conversions are performed first, and then an inverse transform to the degradation function is performed for the image, thereby preventing large noise from being superimposed on the improved image. In addition, for an input image having undergone a linear conversion, an inversion thereto is not performed. Therefore, the time required for the overall improving processing can be shortened, and the load on the processor can be reduced. In this case, since linearity as a precondition for image improving processing, no large noise is superimposed on the improved image.

[Third Embodiment]

Figure 7:
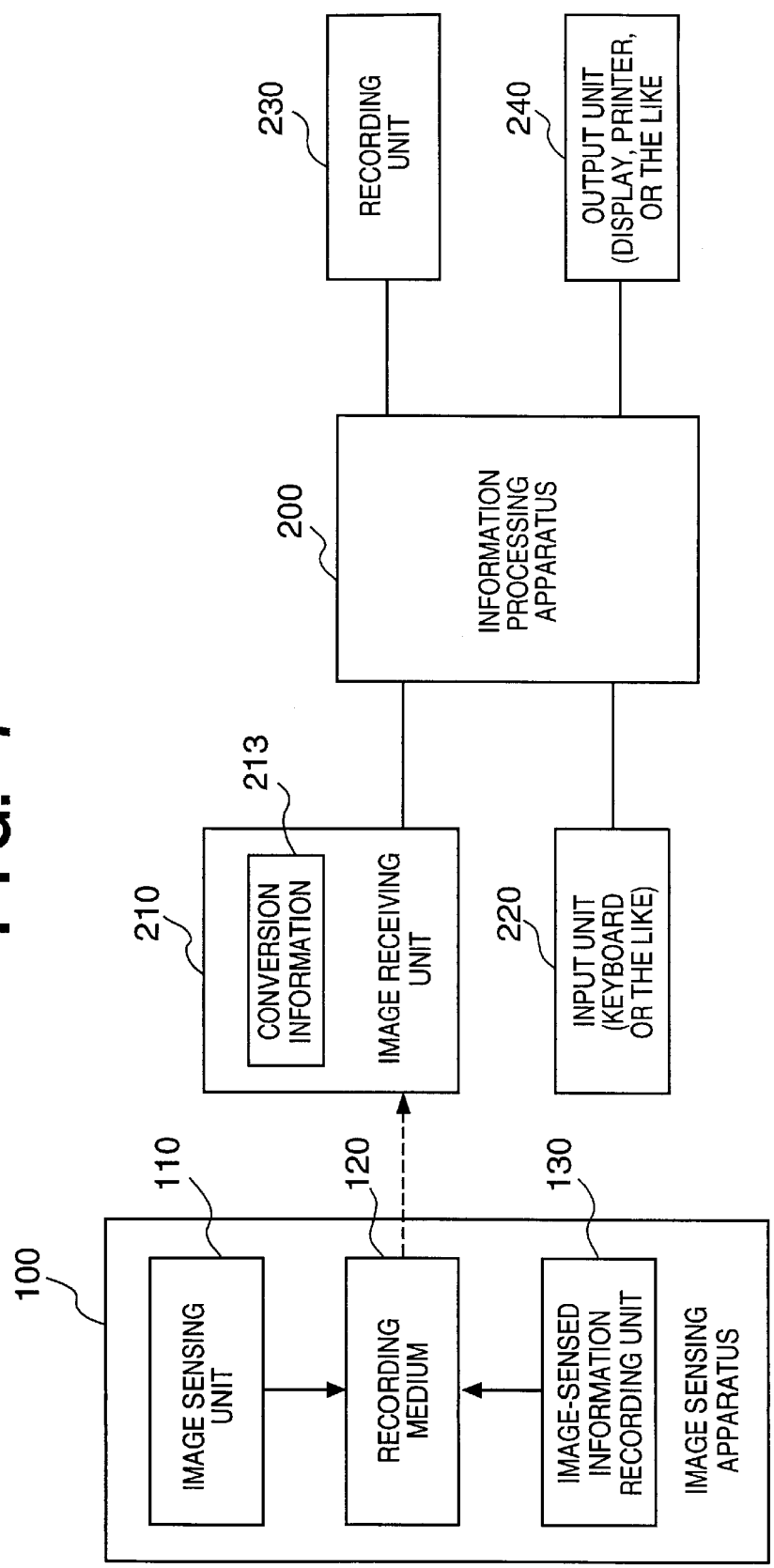
FIG. 7 is a block diagram showing the schematic arrangement of an image processing system according to the third embodiment of the present invention.

FIG. 7 shows the schematic arrangement of an image processing system according to the third embodiment of the present invention. The same reference numerals in this embodiment denote the same parts as those of the image processing apparatus according to the first embodiment, and a description there of will be omitted.

An image sensing apparatus 100 according to this embodiment includes an image-sensed information recording unit 130 for acquiring information related with image degradation (degradation-related information) such as degradation parameters (e.g., a shake direction and shake speed) indicating the physical quantities of events that cause image degradation, image sensing conditions (e.g., an exposure time, exposure amount, distance to an object, and the focal length of the lens), and the characteristic information on the image sensing apparatus (e.g., the optical characteristic of the lens and the identification information of the image sensing apparatus), and writing the acquired information on an objective lens 120. In this case, for example, degradation parameters are detected by an acceleration sensor and the like.

An image receiving side 210 reads out this image-sensed information from the objective lens 120, and transfers the information as, for example, additional information of the image-sensed information to an information processing apparatus 200. In addition, the image receiving side 210 includes a memory 213 for holding conversion information for specifying processing to be used to convert image information, and transfers this conversion information as, for example, additional information of image information to the information processing apparatus 200.

In this embodiment, therefore, the information processing apparatus 200 can acquire degradation-related information and conversion information from the image receiving side 210.

Figure 8:
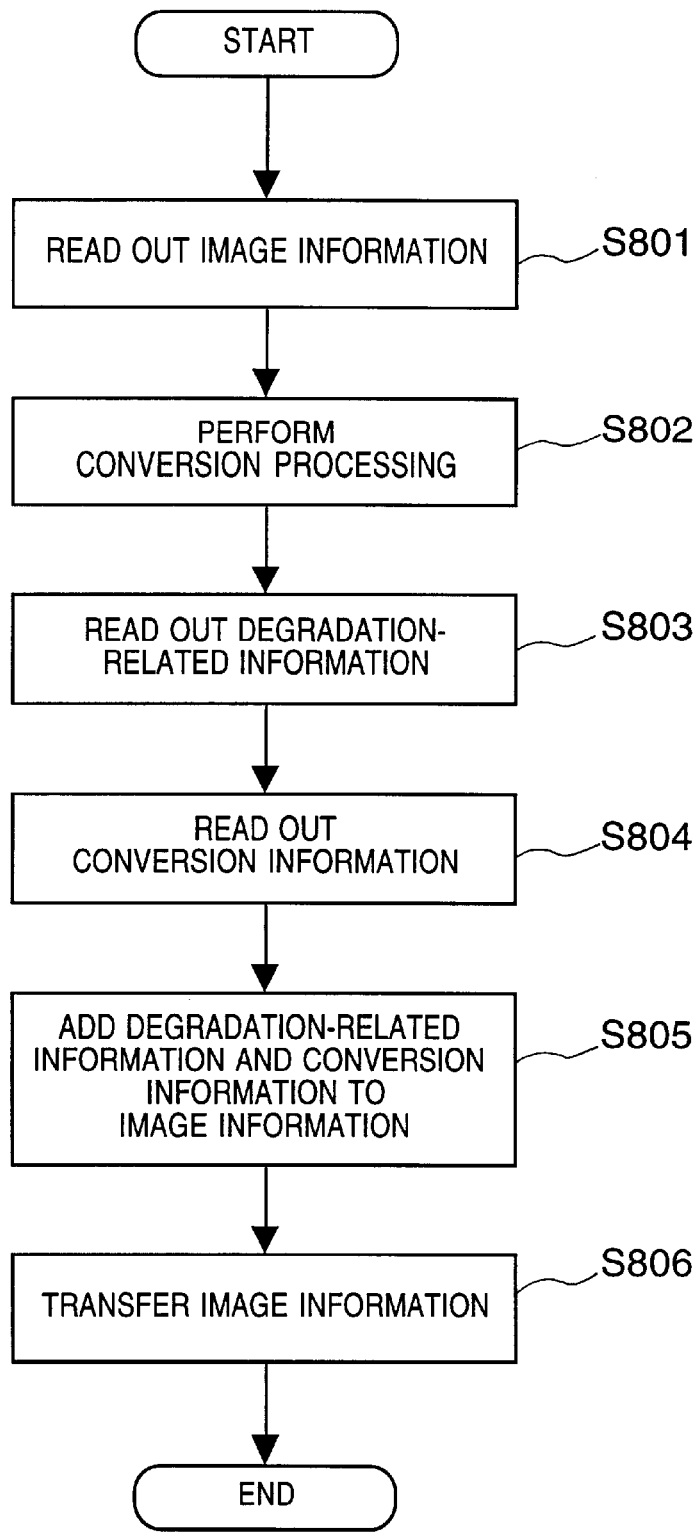
FIG. 8 is a flow chart showing the flow of operation of an image receiving unit in FIG. 7.

FIG. 8 is a flow chart showing the operation of the image receiving unit 210. Note that the processing shown in this flow chart is executed by a CPU (not shown) on the basis of a program stored in, for example, a memory (not shown).

In step S801, the image receiving unit 210 reads out image information from the recording medium 120. In step S802, the image receiving unit 210 performs conversion processing for the image information. This conversion processing includes processing such as gamma correction and color conversion (nonlinear conversion processing). In this case, as in the second embodiment, conversion processing may be selectively executed by the image receiving unit 210.

In step S803, the image receiving unit 210 reads out degradation-related information from the recording medium 120. In step S804, the image receiving unit 210 reads out the conversion information held in the memory 213. In this case, if conversion processing is selectively executed by the image receiving unit 210, information corresponding to the selected conversion processing is read out from the memory 213.

In step S805, the degradation-related information and conversion information are added as pieces of additional information to the image information. More specifically, the image receiving unit 210 converts the image information read out from the recording medium 120 into data in a general-purpose format such as the TIFF format or JPEG format, and transfers the data to the information processing apparatus 200. Many such general-purpose formats have header portions on which additional information other than image information can be recorded. Image-sensed information and conversion information can therefore be recorded on the header portion.

In step S806, the image information to which the degradation-related information and conversion information are added is transferred to the information processing apparatus 200. Note that the degradation-related information and conversion information may not be transferred as additional information to the image information but may be transferred separately to the information processing apparatus 200.

Figure 9:
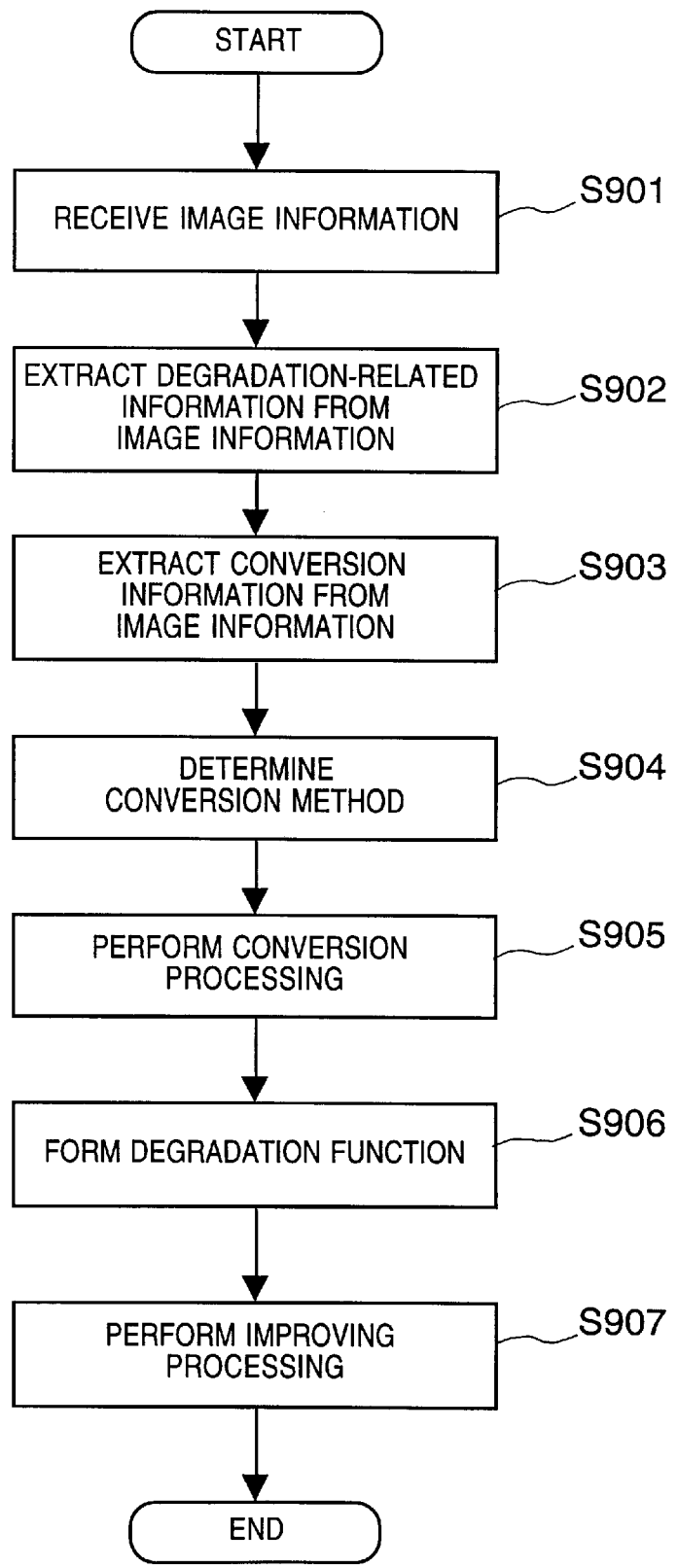
FIG. 9 is a flow chart showing the flow of operation of an information processing apparatus in FIG. 7.

FIG. 9 is a flow chart showing the flow of operation of the information processing apparatus 200 shown in FIG. 7. Note that the processing shown in this flow chart is executed by the CPU (not shown) on the basis of a program stored in the memory (not shown).

In step S901, the information processing apparatus 200 receives image information to which additional information from the image receiving unit 210 is added. In step S902, the information processing apparatus 200 extracts degradation-related information from the image information. In step S903, the information processing apparatus 200 extracts conversion information from the image information.

In step S903, the information processing apparatus 200 determines a conversion method used to convert the image information supplied from the image receiving unit 210. More specifically, the information processing apparatus 200 determines a conversion method on the basis of the conversion information (the image-sensed information acquired in step S902, as needed, instead of the conversion information) acquired in step S903. The conversion method determined in this case is a method of converting image information to set an exposure amount and pixel value in a proportional relationship so as to ensure linearity as a precondition for an algorithm for the above image improving processing. More specifically, this method is the same as that used in the first embodiment.

In step S905, the received image information is converted in accordance with the conversion method determined in step S904.

In step S906, a degradation function H(u, v) is formed on the basis of the characteristic information on the image sensing apparatus 100 which is acquired in step S902. Note that the degradation function has been described in "BACKGROUND OF THE INVENTION".

In step S907, an image f(x, y) with little degradation is reconstructed from the image information (image g(x, y)) converted in step S905. More specifically, a Fourier transform G(u, v) of the image g(x, y) is multiplied by 1/H(u, v) to obtain a Fourier transform F(u, v) of the image f(x, Y). An inverse Fourier transform of F(u, v) is then performed to improve the image f(x, y) with little degradation.

According to this embodiment, the information processing apparatus 200 acquires the image-sensed information generated by the image sensing apparatus 100 through the image receiving unit 210 and forms a degradation function on the basis of this image-sensed information. Therefore, an improved image nearer to the ideal image can be obtained. In addition, the information processing apparatus 200 acquired conversion information from the image receiving unit 210, and hence can flexibly cope with an update, change, and the like in the image receiving unit 210.

[Fourth Embodiment]

In this embodiment, the processing performed by the information processing apparatus 200 in the first to third embodiments is modified. More specifically, image processing is additionally performed after step S307, S608, or S907 serving as the improving processing step. As this additional image processing (to be referred to as post-processing hereinafter), γ correction, color correction, or the like is suitably added. The reason for this will be described below.

In the first to third embodiments, the information processing apparatus 200 converts received image information into linear image information. This conversion increases the improving effect, as described above. On the other hand, the image corrected by the image receiving unit 210 upon conversion processing is restored to a state similar to the state of the image sensed by the image sensing apparatus 100. That is, the image information converted by the information processing apparatus 200 is equivalent to the image without γ correction and color correction. For this reason, the image represented by this image information looks very dark as a whole. In addition, since the image represented by this image information is the image obtained without correcting the characteristics of the image sensing apparatus 100, the color gradation, luminance distribution, and the like are not optimized.

This problem is preferably solved by executing post-processing after the improving processing. This post-processing is preferably the same as the processing performed by an image receiving unit 210. In other words, this processing is preferably equivalent to inversion to the conversion processing (step s305, S606, or S905) performed by an information processing apparatus 200. In addition, this post-processing is preferably optimized on the basis of image-sensed information acquired as degradation-related information (image sensing conditions, in particular). Furthermore, the post-processing is preferably optimized in consideration of characteristic information from an output unit 240.

It is further preferable that the contents of this post-processing be adaptively changed in accordance with the degree and type (e.g., a shake or blur) of degradation estimated on the basis of degradation-related information (degradation parameters, in particular). If, for example, it is determined on the basis of degradation-related information that the degree of degradation is high, the possibility of superimposition of large noise is high. In this case, therefore, noise removal processing using a bandpass filter is preferably added as post-processing. If it is determined that the degree of degradation is low, the possibility of superimposition of large noise is low. In this case, therefore, edge emphasis processing is preferably added as post-processing to attain a higher image quality.

[Fifth Embodiment]

Figure 10:
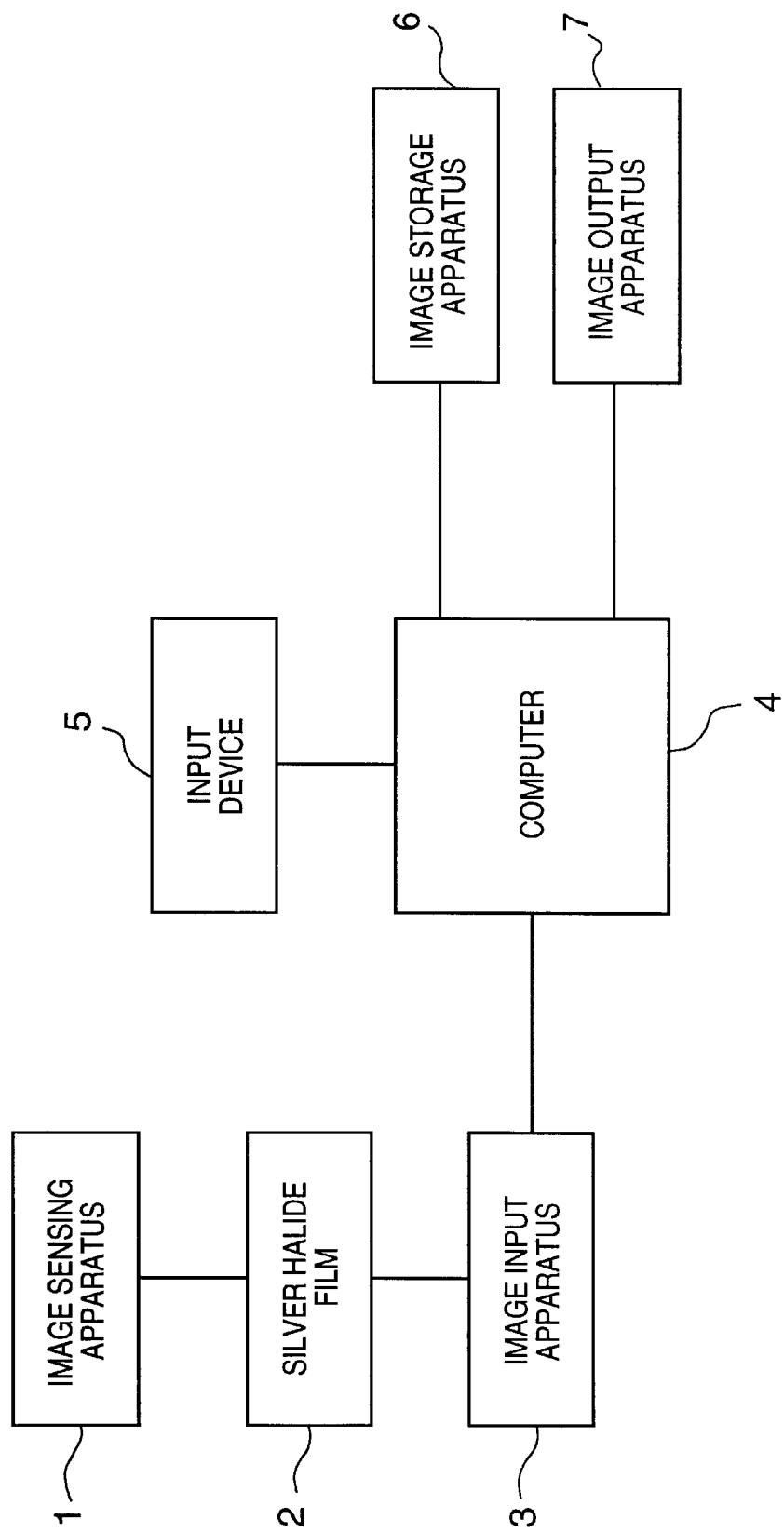
FIG. 10 is a block diagram showing the schematic arrangement of an image improving system according to the fifth embodiment.

FIG. 10 is a block diagram showing the schematic arrangement of an image improving system according to the fifth embodiment.

An image sensed by an image sensing apparatus 1 such as a camera is formed into an electronic image by an image input apparatus 3 such as a film scanner by using a silver halide film 2 as a medium. The output of the image input apparatus 3 is connected to a computer 4. An input device 5 such as a keyboard, image storage apparatus 6 such as a magnetic disk, and image output apparatus 7 such as a display or printer are connected to the computer 4.

The image sensed by the image sensing apparatus 1 is recorded on the silver halide film 2. In addition, arbitrary information other than the image information can be magnetically recorded on the film. Since many techniques of magnetically recording information on a film have already been disclosed, a description thereof will be omitted in this embodiment. The image information and magnetic information recorded on the silver halide film 2 are loaded into the computer 4 through the image input apparatus 3. The loaded image is subjected to the processing shown in the flow chart of FIG. 11 in accordance with an instruction from the input device 5. The resultant image is displayed on the image output apparatus 7. In addition, the processed image is stored in the image storage apparatus 6, as needed.

Figure 11:
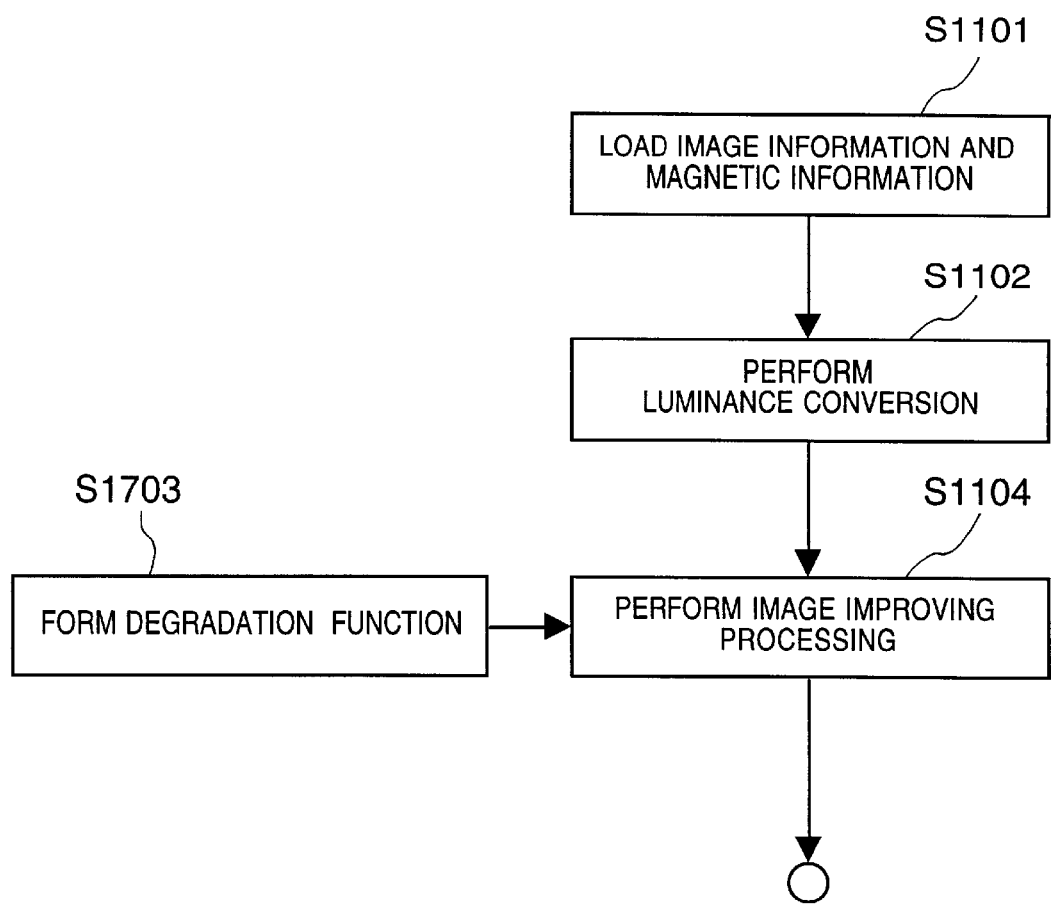
FIG. 11 is a flow chart showing an image improving method using the image improving system of the fifth embodiment.

An image improving method using the image improving system will be described next with reference to the flow chart of FIG. 11.

First of all, in step S1101, electronic image information is loaded by the image input apparatus 3. In step S1102, pixel value conversion is performed in consideration of the characteristic information on the image sensing apparatus 1, silver halide film 2, and image input apparatus 3.

The purpose of the image conversion in step S1102 is to maintain linearity as a precondition for an image improving algorithm (deconvolution) and perform a conversion so as to set the exposure amount and pixel value in a proportional relationship. Each characteristic information can be used by storing a table of the types of image sensing apparatus 1, silver halide film 2, and image input apparatus 3 and corresponding characteristic information in the computer 4. In addition, the characteristic information on the image sensing apparatus 1 and silver halide film 2 can be used through a means for magnetically recording information on the silver halide film 2. Characteristic information includes lens aberrations, ISO or the type of film, film γ value, and the like.

The processing in step S1102 will be described in detail below. For the sake of simplicity, only the gamma characteristic (film γ) of a film will be considered as characteristic information. Letting f(x, y) be the image information proportional to the amount of exposure light incident on the image sensing plane in the image sensing apparatus, g(x, y) be the image information after a conversion based on the film γ is expressed as $$g(x, y) = f(x, y)^{-1/\gamma} \qquad (15)$$

That is, the image information recorded on the film having this gamma characteristic is expressed by equation (15). To obtain image information while maintaining linearity, inversion to equation (15) is performed. When the inversion to equation (15) is performed for the image information g(x, y) read from the film, the image information f(x, y) proportional to the amount of exposure light can be obtained. In this case, characteristics other than the film γ, e.g., lens aberrations and scanner γ, can be properly coped with by sequentially performing inversions upon modeling of characteristic information and conversion systems.

In step S1103, a degradation function required for image improving processing is formed. Image improving processing is performed in step S1104 by using the image information obtained in step S1102 and the degradation function obtained in step S1103.

As described above, according to the image improving system of the fifth embodiment, image conversion is performed to maintain the linearity of image information and set the exposure light amount and pixel value in a proportional relationship on the basis of the characteristic information on the image sensing apparatus, film, and image input apparatus. Thereafter, image improving processing is performed. By using the image improving algorithm (deconvolution), therefore, a high-precision image improvement can be attained while noise is suppressed to a minimum level.

[Sixth Embodiment]

The sixth embodiment will be described next. The schematic arrangement of an image improving system of the sixth embodiment is the same as that shown in FIG. 10. The same reference numerals in this embodiment denote the same parts of the fifth embodiment, and a description thereof will be omitted. In addition to the procedure in the fifth embodiment, this embodiment includes the step of sensing an image on a silver halide film 2 using an image sensing apparatus 1, and magnetically recording image sensing conditions, sensor outputs, and the like on the silver halide film 2 in addition to the characteristic information on the image sensing apparatus 1 and silver halide film 2. The data recorded on the film includes a shake direction, shake speed, and the like detected by an acceleration sensor, image sensing conditions to be set (e.g., an exposure time, exposure light amount, distance to an object, and the focal length of the lens), characteristic information on the image sensing apparatus (e.g., the optical characteristics of the lens and the identification information of the mage sensing apparatus), and the like. These data are used as degradation parameters indicating the physical quantities of events that cause image degradation. Only processing to be performed for the image information loaded into a computer 4 will be described below.

Figure 12:
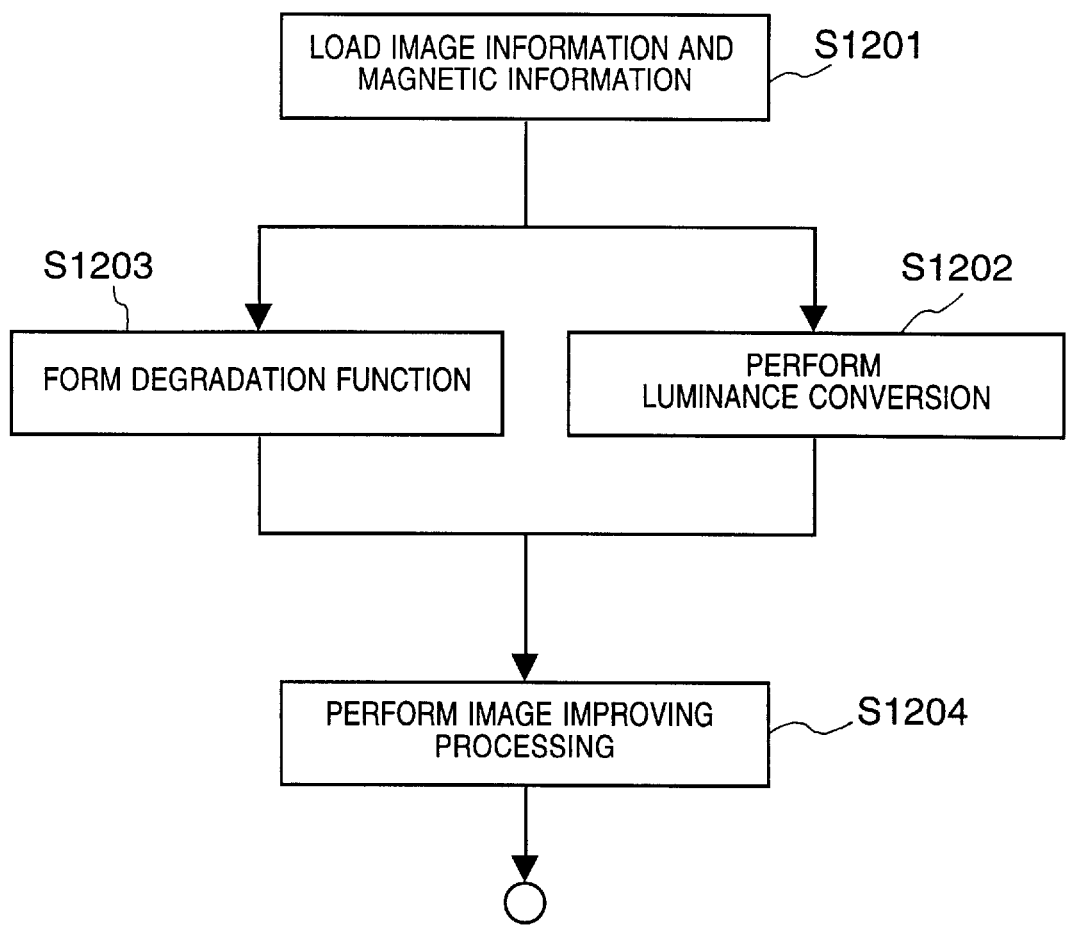
FIG. 12 is a flow chart showing an image improving method using an image improving system according to the sixth embodiment.

FIG. 12 is a flow chart showing the processing performed in the computer in this embodiment.

First of all, in step S1201, electronic image information is loaded through the image input apparatus 3. At the same time, the magnetic information recorded on the silver halide film 2 is read. The magnetic information includes image sensing conditions and sensor outputs on which degradation information is based as well as the characteristic information on the image sensing apparatus 1 and silver halide film 2. Consider a blurred image. A more accurate degradation function can be formed by recording a shake path and shake speed during exposure, based on an exposure time and sensor outputs, as degradation information on a shake. Since detailed degradation information on other types of degraded images such as an out-of-focus image can be obtained, the effect of improving processing to be performed afterward increases.

In step S1202, a pixel value conversion is performed in consideration of the characteristic information on the image sensing apparatus 1, silver halide film 2, and image input apparatus 3. With this operation, the conversion is performed to set the exposure light amount and pixel value in a proportional relationship.

In step S1203, a degradation function required for image improving processing is formed by using the magnetic information loaded in step S1201. Image improving processing is performed in step S1204 by using the image information obtained in step S1202 and the degradation function obtained in step S1203.

According to the sixth embodiment, in addition to the effects obtained by the fifth embodiment, an image with a higher precision can be obtained by adding degradation information based on image sensing conditions and sensor outputs, together with the characteristic information.

[Seventh Embodiment]

The seventh embodiment will be described next. The schematic arrangement of an image improving system according to the seventh embodiment is the same as that shown in FIG. 10. The same reference numerals in this embodiment denote the same parts as those in the fifth embodiment, and a description thereof will be omitted. In addition to the procedure in the fifth embodiment, this embodiment includes the step of sensing an image on a silver halide film 2 using an image sensing apparatus 1, and magnetically recording image sensing conditions, sensor outputs, and the like on the silver halide film 2 in addition to the characteristic information on the image sensing apparatus 1 and silver halide film 2. Only processing to be performed for the image information loaded into a computer 4 will be described below.

Figure 13:
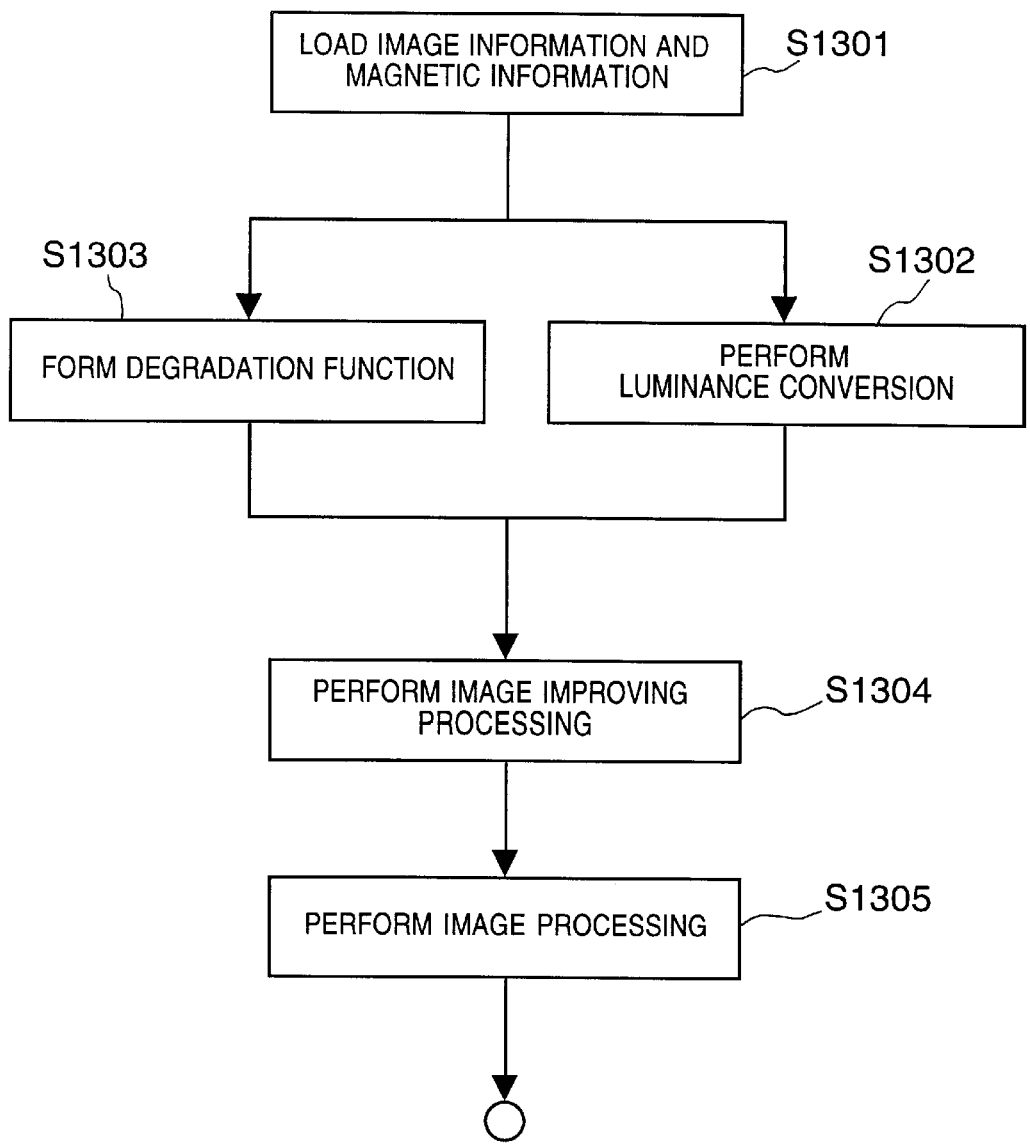
FIG. 13 is a flow chart showing an image improving method using an image improving system according to the seventh embodiment.

FIG. 13 is a flow chart showing the processing performed in the computer in this embodiment.

First of all, in step S1301, electronic image information is loaded through an image input apparatus 3. At the same time, the magnetic information recorded on the silver halide film 2 is read. The magnetic information includes image sensing conditions, sensor outputs, and the like, on which degradation information is based, in addition to the characteristic information on the image sensing apparatus 1 and silver halide film 2, as described above.

In step S1302, pixel value conversion is performed in consideration of the characteristic information on the image sensing apparatus 1, silver halide film 2, and image input apparatus 3. With this operation, the conversion is performed to set the exposure light amount and pixel value in a proportional relationship.

In step S1303, a degradation function required for image improving processing is formed by using the magnetic information loaded in step S1301. Image improving processing is performed in step S1304 by using the image information obtained in step S1302 and the degradation function obtained in step S1303.

The improving effect in step S1304 increases owing to the conversion in step S1302. However, several new problems arise. First, since gamma correction processing and the like are omitted, the resultant image looks very dark as a whole. Second, since data is output from a processing system totally different from the original processing system, the luminance distribution and color tone of the image differ. Finally, the improving effect varies depending on the degree of degradation, and hence the degree of noise superimposed on image information varies.

To solve the above problems, image processing is performed in step S1305 in consideration of magnetic information including the image information obtained in step S1304. For example, the above problems that the image becomes dark and the luminance distribution varies can be solved by performing inversion to the pixel value conversion performed in step S1302 for the improved image obtained in step S1304. In addition, by using the characteristic information on each image output apparatus, more effective image formation can be performed by image processing suited to the characteristics of each apparatus. More specifically, an image with higher quality can be output by performing a gamma conversion corresponding to the gamma characteristics of the printer or display to which image information is output.

In addition, image processing to be performed can be adaptively changed by estimating the degree or type (a shake or blur) of degradation on the basis of the degradation information included in the magnetic information loaded in step S1301. More specifically, if, for example, it is determined on the basis of the degradation information that the degree of degradation is high, the noise superimposed on the image information is large. In this case, therefore, noise removal processing using a bandpass filter can be additionally performed as post-processing. If it is determined that the degree of degradation is low, the noise superimposed on the image information is small. In this case, therefore, edge emphasis processing or the like can be performed to increase the image improving effect. In this manner, post-processing can be easily and adaptively added on the basis of degradation information.

As described above, according to the seventh embodiment, in addition to the effects obtained by the sixth embodiment, an image with a higher precision can be obtained by performing the image processing in step S1305.

[Eighth Embodiment]

Figure 14:
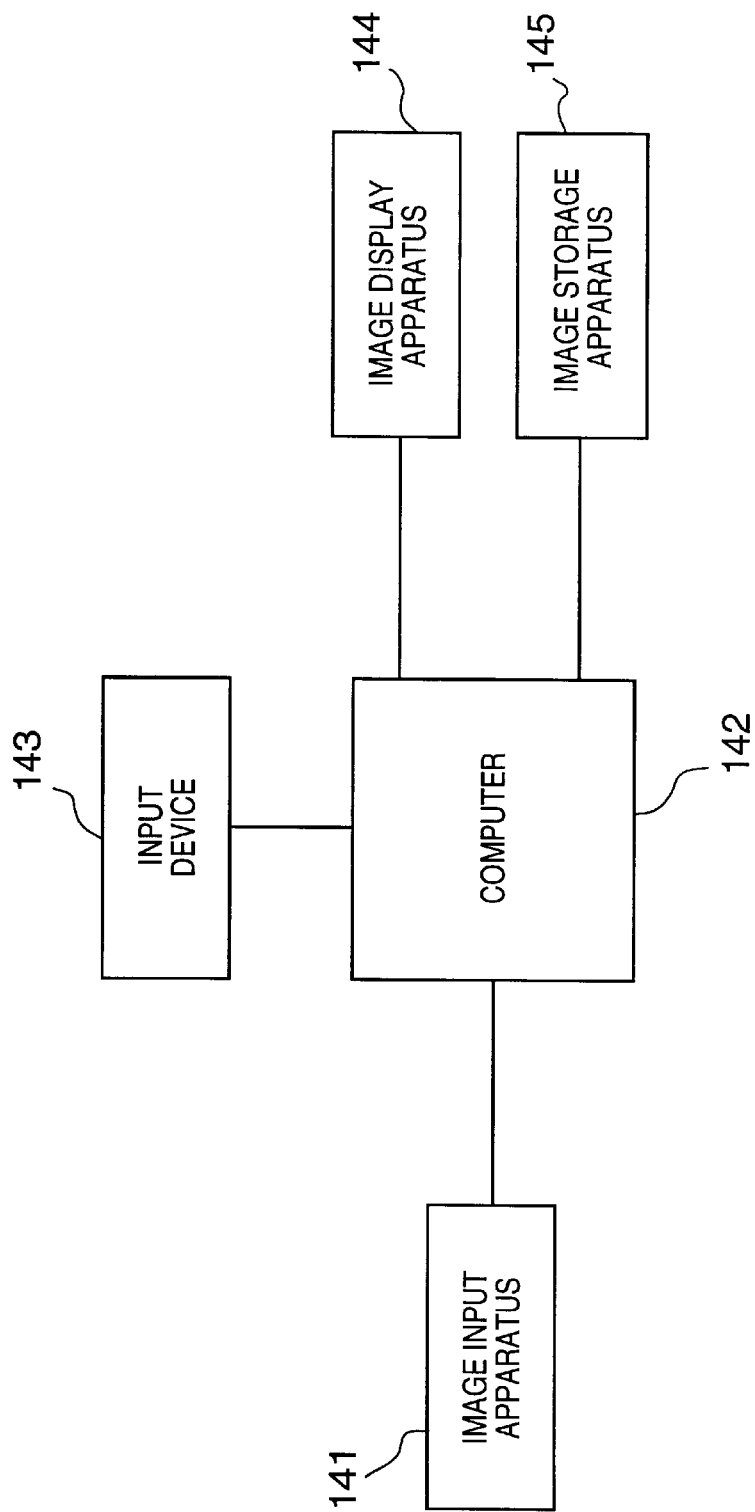
FIG. 14 is a block diagram showing an image processing system according to the eighth to 10th embodiments.

FIG. 14 is a block diagram showing the arrangement of the eight to 10th embodiments. Referring to FIG. 14, an image input apparatus 141 such as a film scanner or digital camera is connected to a computer 142. The image input apparatus 141 is used to input image data to the computer 142. An input device 143 such as a keyboard, image display apparatus 144 such as a display, and image storage apparatus 145 such as a magnetic disk are connected to the computer 142.

Figure 15:
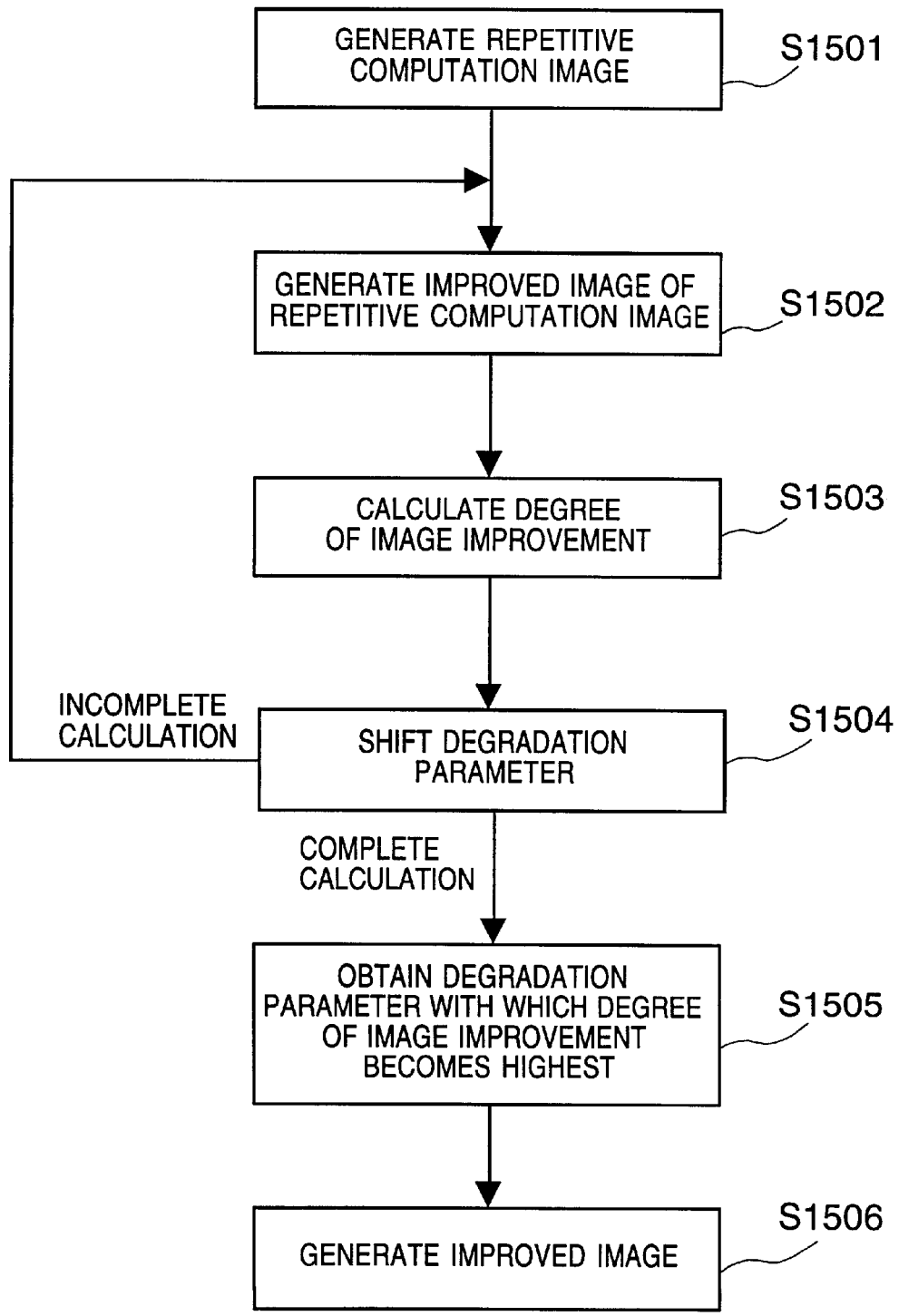
FIG. 15 is a flow chart showing a procedure for image improvement in the eighth embodiment.

An image loaded into the computer 142 through the image input apparatus 141 is subjected to the processing shown in the flow chart of FIG. 15 in accordance with instructions from the input device 143. The resultant image is displayed on the image display apparatus 144. The processed image is also stored in the image storage apparatus 145, as needed.

The flow chart of FIG. 15 will be described next.

First of all, in step S1501, an image (to be referred to as a repetitive computation image) for an image correction computation to be repetitively performed in the subsequent steps, i.e., steps S1502 to S1504, is generated. As the repetitive computation image in this step, an input degraded image itself may be simply used. Alternatively, an image that can be effectively used to obtain optimal degradation parameters (to be described below) or an image that can suppress the computation load may be generated.

If the degradation function obtained by k degradation parameters expressed by p1, p2, . . . , pk is expressed by H(p1, p2, . . . , pk), image improving processing is performed for the repetitive computation image generated in step S1501 by using the degradation function H(p1, p2, . . . , pk). For example, with regard to a blurred image, an improved image is generated by using an image improving algorithm with a Wiener filter or the like on the basis of a degradation function obtained by substitutions of a shake angle $\theta$, shake speed V, and exposure time in equations (8) and (9) described in "BACKGROUND OF THE INVENTION". With regard to an out-of-focus image, an improved image is generated by using the same algorithm on the basis of a degradation function obtained by substitutions of r and $\sigma$ in equation (10).

In step S1503, the degree of image improvement is computed from the improved image obtained in the previous step. The most general case in which as an index indicating the degree of image improvement, a power spectrum (intensity distribution) based on a Fourier transform is used in consideration of the frequency characteristics of an improved image will be described. In general, in a degraded image (blurred image, out-of-focus image, or the like), edge portions (high-frequency components), at which changes in luminance should be acute, becomes moderate (low-frequency component) due to degradation. The low-frequency components due to the degradation are restored to high-frequency components by the image improving algorithm. For this reason, the degree of image improvement of an improved image can be regarded as higher with an increase in the number of high-frequency components on the frequency distribution. Letting R(x, y) be the real part of the Fourier transform image of an improved image g(x, y) and I(x, y) be the imaginary part, a power spectrum P(x, y) is given by $$P(x,y) = R^2(x,y) + I^2(x,y) \quad (16)$$

In this case, letting $(x_0, y_0)$ be the center coordinates of an image P(x, y) and P(r) be the luminance of a pixel at a distance r from the center coordinates, a center of gravity C on the frequency distribution is expressed as $$C = \frac{\sum rP(r)}{\sum P(r)} \quad \left(r = \sqrt{(x-x_0)^2 + (y-y_0)^2}\right) \quad (17)$$

This indicates that as the calculated center of gravity C increases, the center of gravity is located on a high frequency on the frequency distribution.

Although the center of gravity in the entire frequency region of the power spectrum P(x, y) is obtained according to equation (17), efficient operation can be performed by obtaining the center of gravity in a specific frequency band in some case. For example, it is known that in an image improving algorithm based on deconvolution using a Wiener filter or the like, noise due to a parameter error or the like appears in a high-frequency component of an improved image. In this case, as an index representing the degree of image improvement, the center of gravity in a specific frequency range except for a high-frequency region including many noise components is preferably obtained. If the range in which the center of gravity on a frequency distribution is obtained is defined as $a \leq r \leq b$, equation (17) is rewritten into $$C' = \frac{\sum rP(r)}{\sum P(r)} \quad \left(a \leq r \leq b, r = \sqrt{(x-x_0)^2 + (y-y_0)^2}\right) \quad (18)$$

It is therefore determined that the degree of image improvement increases with an increase in the center of gravity C' in the specific frequency range.

The operation in steps S1502 to S1504 is repeated while a degradation parameter is shifted in step S1504. As a method of shifting a degradation parameter, a method of obtaining an approximate value with a large step width first, and then calculating a value around the approximate value with a small step width is available. In addition, the operator can designate a step width for a shift. In step S1505, a degradation parameter for the highest degree of image improvement is obtained from the result obtained by the operation in steps S1502 to S1504. Finally, in step S1506, an improved image is generated from the input degraded image by using the degradation function based on the degradation parameter obtained in step S1505 and an image improving algorithm based on a Wiener filter or the like.

If there are a plurality of degradation parameters, one parameter is shifted at a time. If the highest degree of image improvement is obtained when a given parameter assumes a given value, another parameter is shifted. An improved image is generated and the degree of image improvement is obtained while the parameter is shifted, thereby determining a parameter value with which the highest degree of image improvement can be obtained. This operation may be repeated for each parameter.

With the above procedure, even if the value of a degradation parameter is unknown, the value of the degradation parameter can be determined to make an improved image have the highest quality, and a degraded image can be optimally improved by using the parameter. Even if, therefore, degradation parameters in image sensing operation, e.g., information such as an acceleration exerted on the camera itself and image sensing conditions such as an exposure time and exposure light amount, are not prepared for image improvement, a high-quality image can be obtained.

In addition, since no degradation parameters need to be prepared, an improved image can be obtained from not only an image degraded due to a camera shake itself or the like but also an image degraded due to the movement of an object.

[Ninth Embodiment]

In this embodiment, a repetitive computation image generation block shown in step S1501 in the flow chart of FIG. 15 will be described in detail.

In the eighth embodiment, an input degraded image is simply used as a repetitive computation image. In this case, however, as the image size increases, the computation load greatly increases, and the processing for the purpose of obtaining a value representing the degree of image improvement becomes redundant. In this embodiment, therefore, a repetitive computation image is obtained by converting an input degraded image having a size $S_x \times S_y$ into an image having a size $s_x \times s_y$ by, for example, thinning out pixels. Many existing techniques are available as algorithms for converting the image size $S_x \times S_y$ into the image size $s_x \times s_y$. For example, the nearest neighbor method, bi-linear method, or bi-cubic method can be used. According to this method, an image having undergone a size conversion has almost the same frequency characteristics as those of an input degraded image, and can complete repetitive computations with a small computation amount. A repetitive computation image size may be fixed in advance or designated by the operator.

Figure 16:
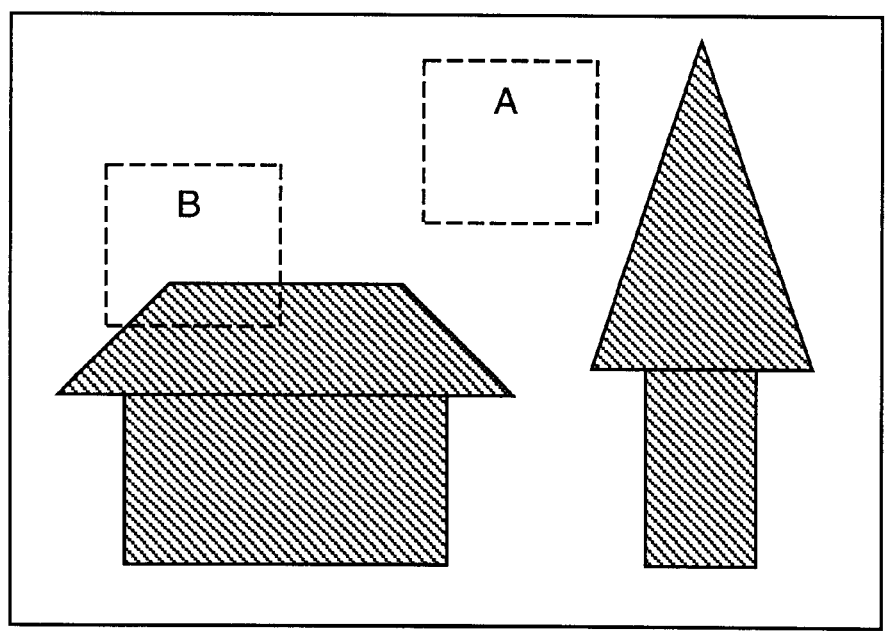
FIG. 16 is a view showing how a repetitive computation image is cut.

Alternatively, the operator may designate a partial area of an input image, and an image cut from the designated area may be used as a repetitive computation image. Assume that the image shown in FIG. 16 is degraded (out-of-focus, blur, or the like). In this case, a change in frequency characteristic due to the degradation is small in an area A because a change in luminance is moderate. At an edge portion in an area B, however, an acute luminance change (high-frequency component) becomes moderate (low-frequency component) due to the degradation. As described above, when a degraded image is improved by cutting a partial area therefrom, the improving effect seems to increase as the center of gravity on the frequency distribution of the improved image shifts to the high-frequency side. That is, when images are compare in terms of the degree of image improvement as in the present invention, the area A is more suited for the determination of the high/low degree of image improvement than the area B. As is obvious from the above description, when the operator designates an area including an edge portion, and an image cut from the area is used as a repetitive computation image, a degradation parameter for the highest degree of image improvement can be effectively obtained with a light computation load.

Figure 17:
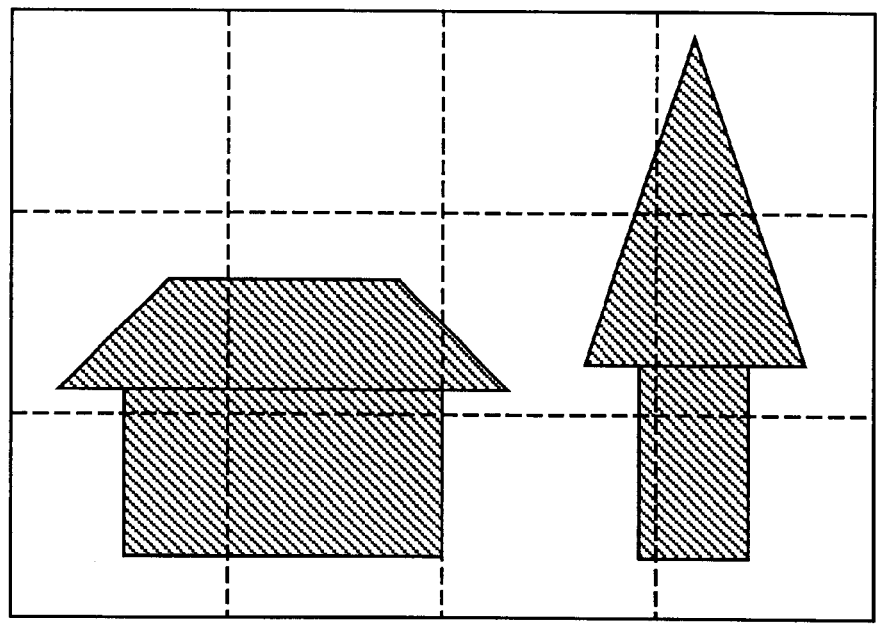
FIG. 17 is a view showing how a repetitive computation image is cut.

A technique of reducing the inconvenience which the operator suffers when he/she designates an area in the above technique will be described below. FIG. 17 shows an example of an input degraded image having the image size $S_x \times S_y$. This input degraded image is divided into a finite number of areas (3×4 areas in FIG. 17) as indicated by the dotted lines in FIG. 17. Assume that each area has the image size $S_x \times S_y$. The number of segmentated areas, the image size of each area, and the like may be arbitrarily designated. The operator selects the most effective area, i.e., the area including most high-frequency components, from a plurality of segmentated areas, and sets the selected area as a repetitive computation image. In addition, a frequency distribution and a class separation degree in the discriminant analysis method may be obtained in units of areas to estimate an area including many edge portions, and the estimated area may be automatically selected as a repetitive computation image.

Figure 18:
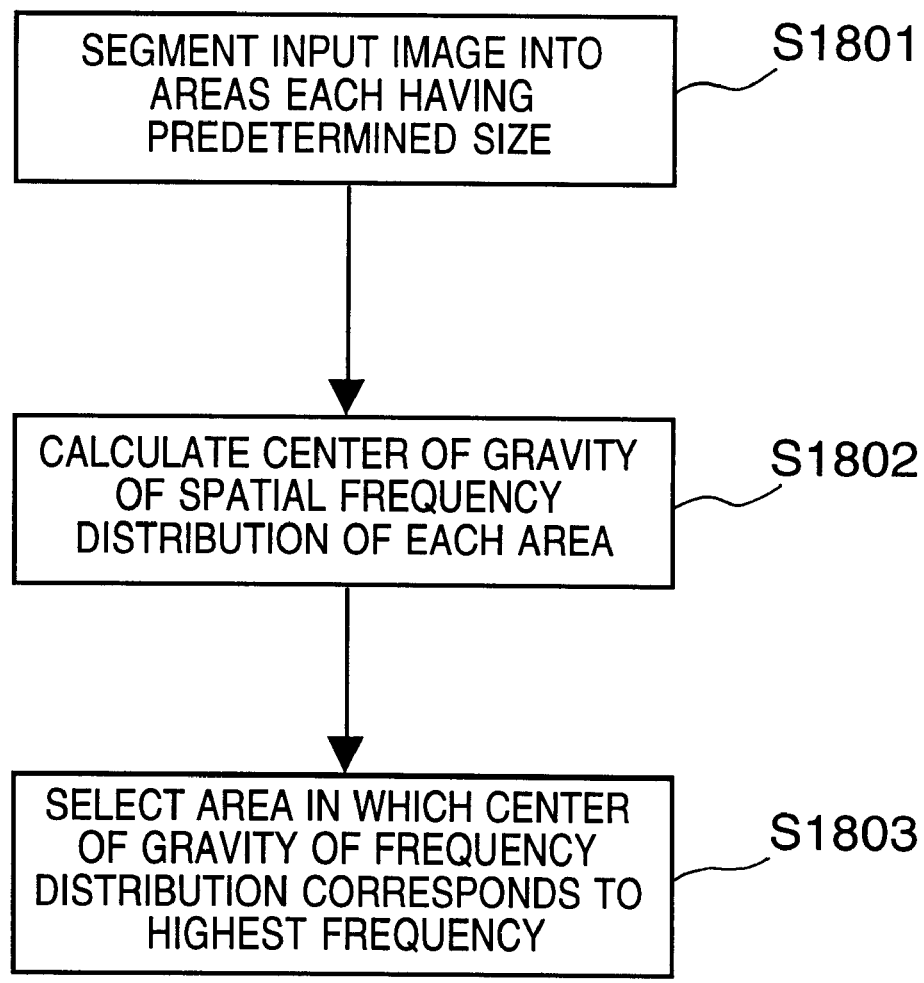
FIG. 18 is a flow chart showing a procedure for area selection in the ninth embodiment.

FIG. 18 shows a procedure for selecting a repetitive computation image from a degraded image. This procedure is executed in step S1501 in FIG. 15 to generate a repetitive computation image.

First of all, in step S1801, an input degraded image is divided into areas each having a predetermined size. In step S1802, a spatial frequency distribution in each area is calculated, and the center of gravity of the distribution is obtained. In step S1803, the area in which the calculated center of gravity corresponds to the highest frequency is selected as a repetitive computation image.

By selecting a part of the image as a repetitive computation image in this manner, the computation amounts in steps S1502 and S1503 in FIG. 15 are reduced to complete the processing quickly.

In addition, by indicating the degree of image improvement with the frequency characteristics of the improved image, the degree of image improvement can be obtained as a numerical value, thereby calculating an optimal degradation parameter without the mediacy of the operator.

Consider an image that is partially blurred, e.g., an image that is partially blurred owing to the movement of an object before the background although the background is not blurred. The blurred portion of even such an image can be improved. For this purpose, this image is segmented into small areas as shown in FIG. 17, and an area including the blurred object is selected as a repetitive computation image. This area is selected by the operator or the like. By executing the procedure in step S1502 and the subsequent steps, the blurred object in the image can be improved into a good image.

[10th Embodiment]

The eighth embodiment is based on the premise that degradation parameters are unknown when an input degraded image is to be improved. In this case, since computations are performed by using all degradation parameters in steps S1502 to S1504, a very large load is exerted on the system. In addition, large errors occur in obtained degradation parameters depending on the image to be improved, and hence the image improving effect may be little.

In this embodiment, a degradation parameter is input or estimated before the procedure in FIG. 15 in the eighth embodiment. When a likely degradation parameter is supplied, image improvement operation can be performed with a higher precision at a higher speed than in the eighth embodiment.

Figure 19:
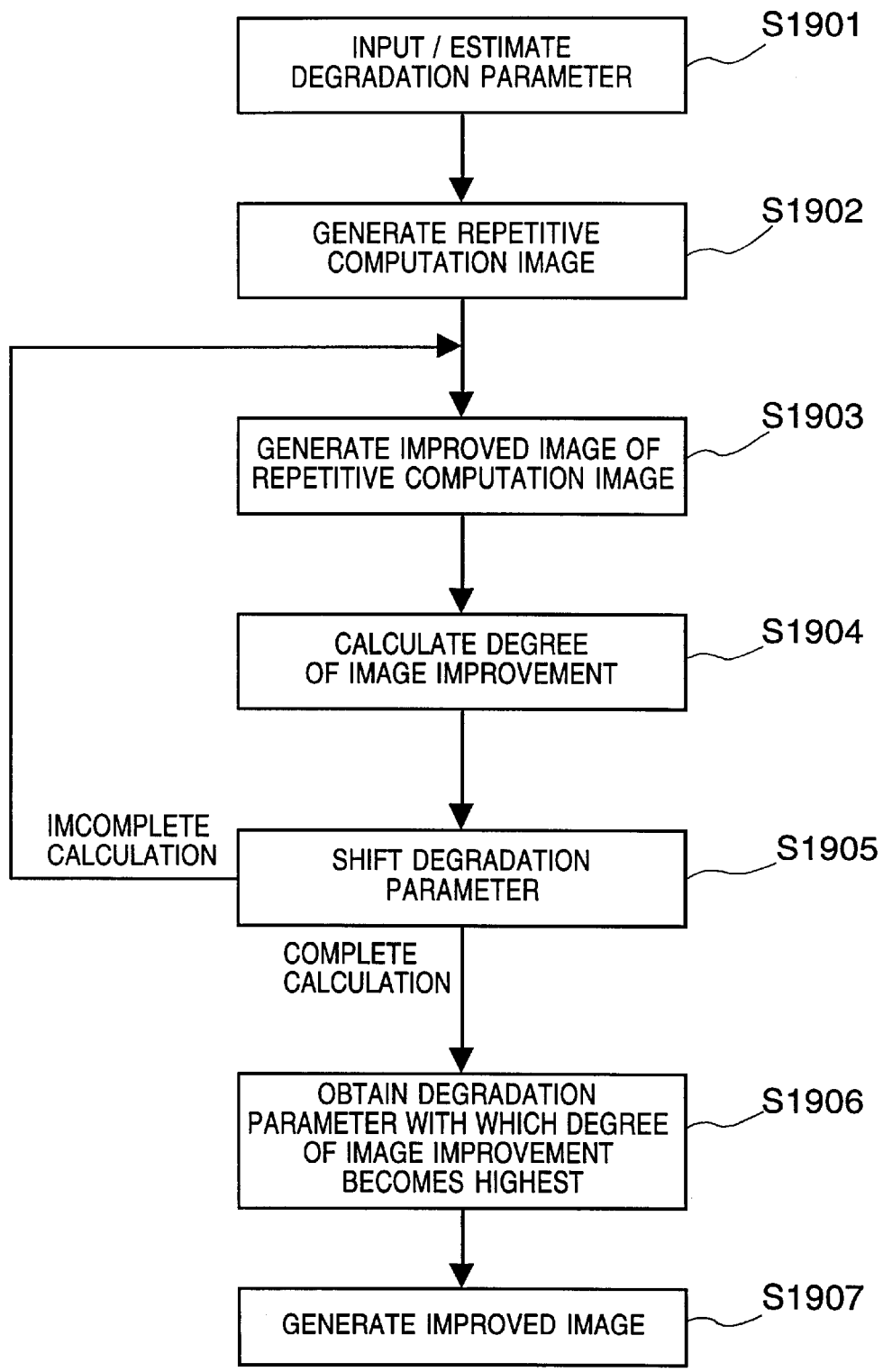
FIG. 19 is a flow chart showing a procedure for image improvement in the 10th embodiment.

FIG. 19 is a flow chart in this embodiment.

First of all, in step S1901, a degradation parameter is input/estimated by the following techniques:

(1) inputting a degradation parameter from the operator;

(2) estimating a degradation parameter on the basis of an output from a measurement device or the like mounted in the image sensing apparatus; and (3) estimating a degradation parameter by image analysis on a degraded image.

According to technique (1), if an infinitely small bright point is present in an image, the operator may input a degradation parameter on the basis of the spread of the bright point. According to technique (2), a degradation parameter can be estimated from image sensing conditions such as the exposure and shutter speed of the image sensing apparatus or an output from the measurement device (such as an acceleration sensor) attached to the image sensing apparatus.

According to technique (3), a degradation parameter is estimated on the basis of the image feature amount (autocorrelation function or the like) of an input degraded image. Many such techniques have been used.

In steps S1902 to S1904, the same processing as that in steps S1501 to S1503 in the flow chart (FIG. 15) in the eighth embodiment is performed. In the degradation parameter shift block in step S1905, assuming that the optimal degradation parameter to be obtained is near the input (estimated) degradation parameter, the degradation parameter is shifted only around the input degradation parameter. In this case, since the range of intervening errors varies depending on the techniques of inputting (estimating) a degradation parameter (techniques (1) to (3)), a shift range is variably set in accordance with the technique by which a degradation parameter is input. Alternatively, the operator may designate a range.

Finally, in steps S1906 and S1907, a degradation parameter for the highest degree of image improvement is obtained, and the input degraded image is improved by using the degradation parameter, as in steps S1505 and S1506 in the flow chart in the eighth embodiment (FIG. 15).

With the above procedure, even if a degradation parameter is input, a high-precision image improvement can be made by repeating a computation within a range near the degradation parameter. In this case, since the number of times the above computation is repeated is limited, improving processing can be performed quickly.

[Other Embodiments]

Note that the present invention may be applied to either a system constituted by a plurality of devices or an apparatus consisting of a single device.

In addition, apparatuses and methods constituted by some constituent elements of all the constituent elements of the apparatuses and methods according to the above embodiments are intended by the inventor of the present application.

The functions of the apparatuses according to the above embodiments can also be achieved by permanently or temporarily incorporating a storage medium, on which program codes are recorded, into a system or apparatus, and making the computer (CPU or MPU) of the system or apparatus read out the program codes from the storage medium and executing them. In this case, the program code itself read out from the storage medium or the storage medium itself constitutes the present invention.

As the storage medium for supplying the program code, for example, a floppy disk, hard disk, optical disk, magneto-optical disk, CD-ROM, CD-R, magnetic tape, nonvolatile memory card, ROM, and the like can be suitably used. However, other devices may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. An image processing method of improving an image sensed by an image sensing apparatus and processed according to a first conversion process, comprising:
    a determining step of determining whether or not the first conversion process includes a nonlinear conversion;
    a conversion step of processing the image according to a second conversion process inverse to the first conversion process if the first conversion process includes the nonlinear conversion; and
    an improving step of processing the image processed in the conversion processing step, according to a function for improving the image.

2. The method according to claim 1, wherein the nonlinear conversion includes a gamma correction.

3. The method according to claim 1, wherein the nonlinear conversion includes a color conversion.

4. The method according to claim 1, further comprising an inputting step of inputting the image with additional information being used to generate the function.

5. The method according to claim 4, wherein the additional information includes information relating to the image sensing apparatus.

6. The method according to claim 4, wherein the additional information includes information relating to image sensing conditions of the image.

7. The method according to claim 1, further comprising a function generating step of generating the function if the first conversion process includes a nonlinear conversion.

8. An image processing apparatus for improving an image sensed by an image sensing apparatus and processed according to a first conversion process, comprising:
    a determining unit adapted to determine whether or not the first conversion process includes a nonlinear conversion;
    a conversion unit adapted to process the image according to a second conversion process inverse to the first conversion process if the first conversion process includes the nonlinear conversion; and
    an improving unit adapted to process the processed in the conversion unit, according to a function for improving the image.

9. The apparatus according to claim 8, wherein the nonlinear conversion includes a gamma correction.

10. The apparatus according to claim 8, wherein the nonlinear conversion includes a color conversion.

11. The apparatus according to claim 8, further comprising an inputting unit adapted to input the image with additional information being used to generate the function.

12. The apparatus according to claim 11, wherein the additional information includes information relating to the image sensing apparatus.

13. The apparatus according to claim 11, wherein the additional information includes information relating to image sensing conditions of the image.

14. The apparatus according to claim 8, further comprising a function generating unit adapted to generate the function if the first conversion process includes a nonlinear conversion.

15. A computer-readable storage medium storing a program for causing a computer to execute an image processing method for improving an image sensed by an image sensing apparatus and processed according to a first conversion process, said program comprising;
- a determining step of determining whether or not the first conversion process includes a nonlinear conversion;
- a conversion procession step of processing the image according to a second conversion process inverse to the first conversion process if the first conversion process includes the nonlinear conversion; and
- an improving step of processing the image processed in the conversion processing step, according to a function for improving the image.

16. The medium according to claim 15, wherein the nonlinear conversion includes a gamma correction.

17. The medium according to claim 15, wherein the nonlinear conversion includes a color conversion.

18. The medium according to claim 15, further comprising an inputting step of inputting the image with additional information being used to generate the function.

19. The medium according to claim 18, wherein the additional information includes information relating to the image sensing apparatus.

20. The medium according to claim 18, wherein the additional information includes information relating to image sensing conditions of the image.

21. The medium according to claim 15, further comprising a function generating step of generating the function if the first conversion process includes a nonlinear conversion.

* * * * *